(12) United States Patent
Lee

(10) Patent No.: US 12,139,957 B2
(45) Date of Patent: Nov. 12, 2024

(54) APPARATUS AND METHOD OF OPENING AND CLOSING TAIL GATE OF VEHICLE

(71) Applicant: HYUNDAI MOBIS CO., LTD., Seoul (KR)

(72) Inventor: Jae Young Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 364 days.

(21) Appl. No.: 17/680,499

(22) Filed: Feb. 25, 2022

(65) Prior Publication Data

US 2022/0275677 A1    Sep. 1, 2022

(30) Foreign Application Priority Data

Feb. 26, 2021  (KR) .................. 10-2021-0026995
Mar. 23, 2021  (KR) .................. 10-2021-0037611

(51) Int. Cl.
| | |
|---|---|
| *E05F 15/73* | (2015.01) |
| *B60R 11/04* | (2006.01) |
| *G06T 7/11* | (2017.01) |
| *G06T 7/13* | (2017.01) |
| *G06T 7/136* | (2017.01) |
| *G06T 7/174* | (2017.01) |
| *G06T 7/50* | (2017.01) |
| *G06T 7/60* | (2017.01) |
| *G06T 7/73* | (2017.01) |
| *B60R 11/00* | (2006.01) |
| *E05F 15/611* | (2015.01) |

(52) U.S. Cl.
CPC .............. *E05F 15/73* (2015.01); *B60R 11/04* (2013.01); *G06T 7/11* (2017.01); *G06T 7/13* (2017.01); *G06T 7/136* (2017.01); *G06T 7/174* (2017.01); *G06T 7/50* (2017.01); *G06T 7/60* (2013.01); *G06T 7/74* (2017.01); *B60R 2011/004* (2013.01); *E05F 15/611* (2015.01); *E05F 2015/767* (2015.01); *E05Y 2201/434* (2013.01); *E05Y 2400/35* (2013.01); *E05Y 2400/45* (2013.01); *E05Y 2400/85* (2013.01); *E05Y 2800/75* (2013.01); *E05Y 2900/546* (2013.01); *G06T 2207/30196* (2013.01); *G06T 2207/30252* (2013.01)

(58) Field of Classification Search
CPC ... E05F 15/73; E05F 15/611; E05F 2015/767; E05Y 2201/434; E05Y 2400/35; E05Y 2400/45; B60R 11/04; B60R 2011/004; G06T 7/11; G06T 7/13; G06T 7/136; G06T 7/174; G06T 7/50; G06T 7/60; G06T 7/74

See application file for complete search history.

(56) References Cited

U.S. PATENT DOCUMENTS

| | | | |
|---|---|---|---|
| 10,577,851 B2 * | 3/2020 | Polewarczyk | E05F 15/73 |
| 10,676,979 B2 * | 6/2020 | Naserian | E05F 15/73 |
| 2011/0215916 A1 * | 9/2011 | Boehme | E05F 15/43 340/436 |

(Continued)

FOREIGN PATENT DOCUMENTS

KR    20180070291 A1    6/2018

*Primary Examiner* — Mussa A Shaawat
(74) *Attorney, Agent, or Firm* — NovoTechIP International PLLC

(57) ABSTRACT

The present invention estimates a height of a user by using a rear camera to automatically adjust the opening amount of a tailgate, so as to increase the convenience of an electrically-powered tailgate.

20 Claims, 14 Drawing Sheets

(56) References Cited

U.S. PATENT DOCUMENTS

| | | | | |
|---|---|---|---|---|
| 2012/0158253 A1* | 6/2012 | Kroemke | ............... | E05F 15/70 |
| | | | | 701/49 |
| 2012/0277958 A1* | 11/2012 | Trombke | ............... | E05F 15/70 |
| | | | | 701/48 |
| 2015/0009062 A1* | 1/2015 | Herthan | ................. | G01S 7/415 |
| | | | | 342/70 |
| 2015/0019085 A1* | 1/2015 | Ma | ....................... | G01S 13/931 |
| | | | | 701/49 |
| 2015/0025751 A1* | 1/2015 | Sugiura | ................... | B60J 5/101 |
| | | | | 701/49 |
| 2016/0057273 A1* | 2/2016 | Bochen | ............... | H04L 67/125 |
| | | | | 455/420 |
| 2017/0154482 A1* | 6/2017 | Osborne | ................. | E05F 15/77 |
| 2017/0342758 A1* | 11/2017 | Grudzinski | ........ | B62D 33/0273 |
| 2017/0342761 A1* | 11/2017 | Conner | ................ | E05F 15/622 |
| 2018/0216395 A1* | 8/2018 | Naserian | ................ | E05F 15/70 |
| 2019/0145151 A1* | 5/2019 | Iikawa | ................... | H02P 23/20 |
| | | | | 49/28 |
| 2019/0323280 A1* | 10/2019 | Ghannam | ............ | E05F 15/668 |
| 2022/0235598 A1* | 7/2022 | Looy | ...................... | G01S 13/04 |

* cited by examiner

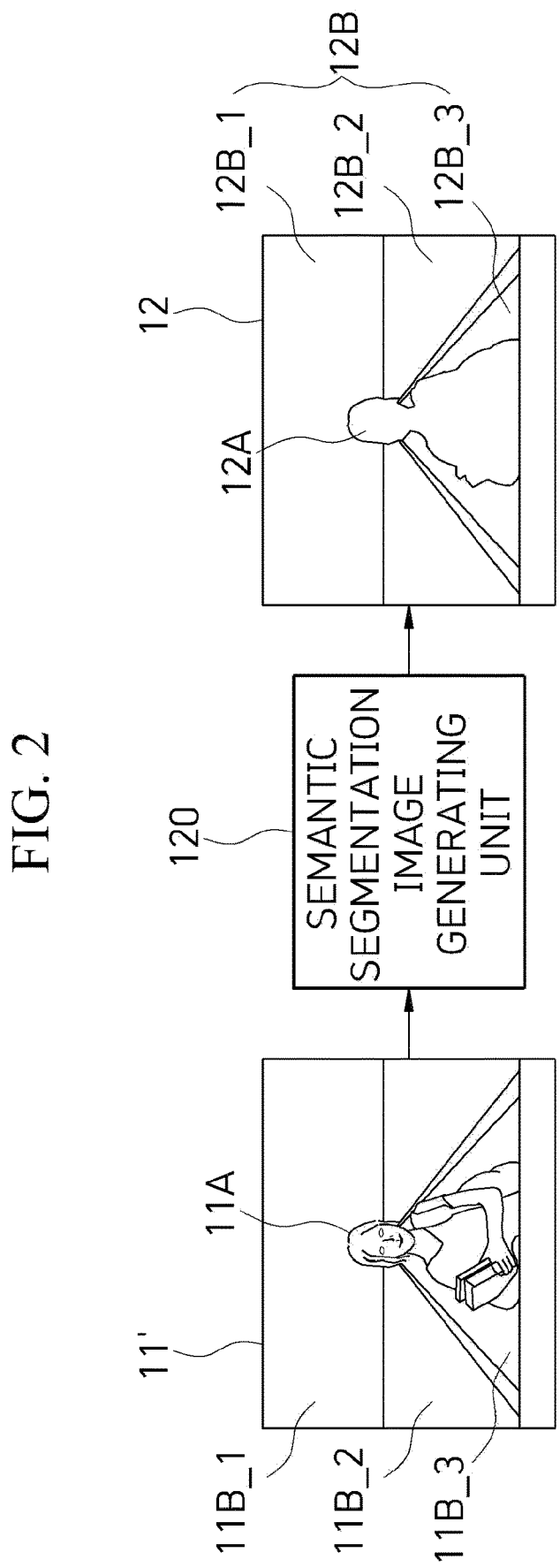

Y AXIS
X AXIS

40

APPARATUS AND METHOD OF OPENING AND CLOSING TAIL GATE OF VEHICLE

CROSS-REFERENCE TO RELATED APPLICATIONS

This application claims priority under 35 U.S.C. § 119 to Korean Patent Application No. 10-2021-0026995, filed on Feb. 26, 2021, and Korean Patent Application No. 10-2021-0037611, filed on Mar. 23, 2021, the disclosure of which is incorporated herein by reference in their entirety.

TECHNICAL FIELD

The present invention relates to an apparatus and method of opening and closing a tailgate of a vehicle, and more particularly, to an apparatus and method of opening and closing a tailgate of a vehicle, which may automatically adjust the opening amount (opening height or opening degree) of a tailgate of a vehicle based on a height of a user.

BACKGROUND

Vehicles released recently provide a function for automatically adjusting the opening amount (opening height or opening degree) of a tailgate of each vehicle based on a height of a user. Such a function provides convenience for enabling a short user (for example, children who are shorter than adults) to easily press a closing button of the tailgate.

The opening speed and/or opening amount of a tailgate may be adjusted through a user setting menu provided through a display device of a vehicle. For example, a user may select a step of displaying a desired opening amount through the user setting menu to set the opening amount of the tailgate. When the user selects a step representing the desired opening amount, the opening amount of the tailgate is fixed and set to the step selected by the user.

In a case where a number of users use one vehicle and a height difference between the users is large, a short user may feel inconvenience in pressing a tailgate closing button due to the opening amount of a tailgate set based on a height of a tall user. In this case, the short user adjusts the opening amount of the tailgate through a user setting menu based on a height of the user.

As described above, when a number of users share one vehicle, it is very inconvenient and difficult for each user to adjust the opening amount of a tailgate through a user setting menu based on its own height each time.

SUMMARY

Accordingly, the present invention provides an apparatus and method of opening and closing a tailgate of a vehicle, which estimate a height of a user by using a rear camera and automatically adjust the opening amount of a tailgate based on the estimated height of the user.

The objects of the present invention are not limited to the aforesaid, but other objects not described herein will be clearly understood by those skilled in the art from descriptions below.

In one general aspect, a method of opening and closing a tailgate of a vehicle includes: photographing a user disposed in front of a tailgate of a vehicle by using a rear camera equipped in the tailgate to obtain temporally continuous rear camera images, while the tailgate is being opened; preprocessing the obtained rear camera images; respectively converting the preprocessed rear camera images into semantic segmentation images; analyzing a position change of a head region of the user shown in the semantic segmentation images to estimate a height of the user; detecting a target opening angle of the tailgate corresponding to the estimated height of the user; and adjusting an opening amount of the tailgate on the basis of the detected target opening angle.

In another general aspect, a method of opening and closing a tailgate of a vehicle includes: photographing a user disposed in front of a tailgate of a vehicle by using a rear camera equipped in the tailgate to obtain first and second rear camera images continued temporally, while the tailgate is being opened; projecting the first and second rear camera images onto an image plane; respectively converting the first and second rear camera images, projected onto the image plane, into first and second semantic segmentation images; calculating a first prediction line connecting first uppermost coordinates of a user region, included in the first semantic segmentation image, to position coordinates of the rear camera disposed at a focal distance from the image plane and calculating a second prediction line connecting second uppermost coordinates of the user region, included in the second semantic segmentation image, to the position coordinates of the rear camera; calculating an intersection point between the first prediction line and the second prediction line and estimating a height of the user by using the calculated intersection point; detecting a target opening angle of the tailgate corresponding to the estimated height of the user; and adjusting an opening amount of the tailgate on the basis of the detected target opening angle.

In another general aspect, an apparatus for opening and closing a tailgate of a vehicle includes: a rear camera equipped in a tailgate of a vehicle to photograph a user disposed in front of the tailgate to obtain temporally continuous rear camera images, while the tailgate is being opened; a preprocessor configured to preprocess the obtained rear camera images; a semantic segmentation image generating unit configured to respectively convert the preprocessed rear camera images into semantic segmentation images; a height estimation unit configured to analyze a position change of a head region of the user shown in the semantic segmentation images to estimate a height of the user; an opening angle calculation unit configured to detect a target opening angle of the tailgate corresponding to the estimated height of the user; and a tailgate driving unit configured to adjust an opening amount of the tailgate on the basis of the detected target opening angle.

Other features and aspects will be apparent from the following detailed description, the drawings, and the claims.

BRIEF DESCRIPTION OF THE DRAWINGS

FIG. 2 is a diagram illustrating an example of a preprocessing image input to a semantic segmentation image generating unit illustrated in FIG. 1 and a semantic segmentation image output from the semantic segmentation image generating unit.

DETAILED DESCRIPTION OF EMBODIMENTS

Figure 1:
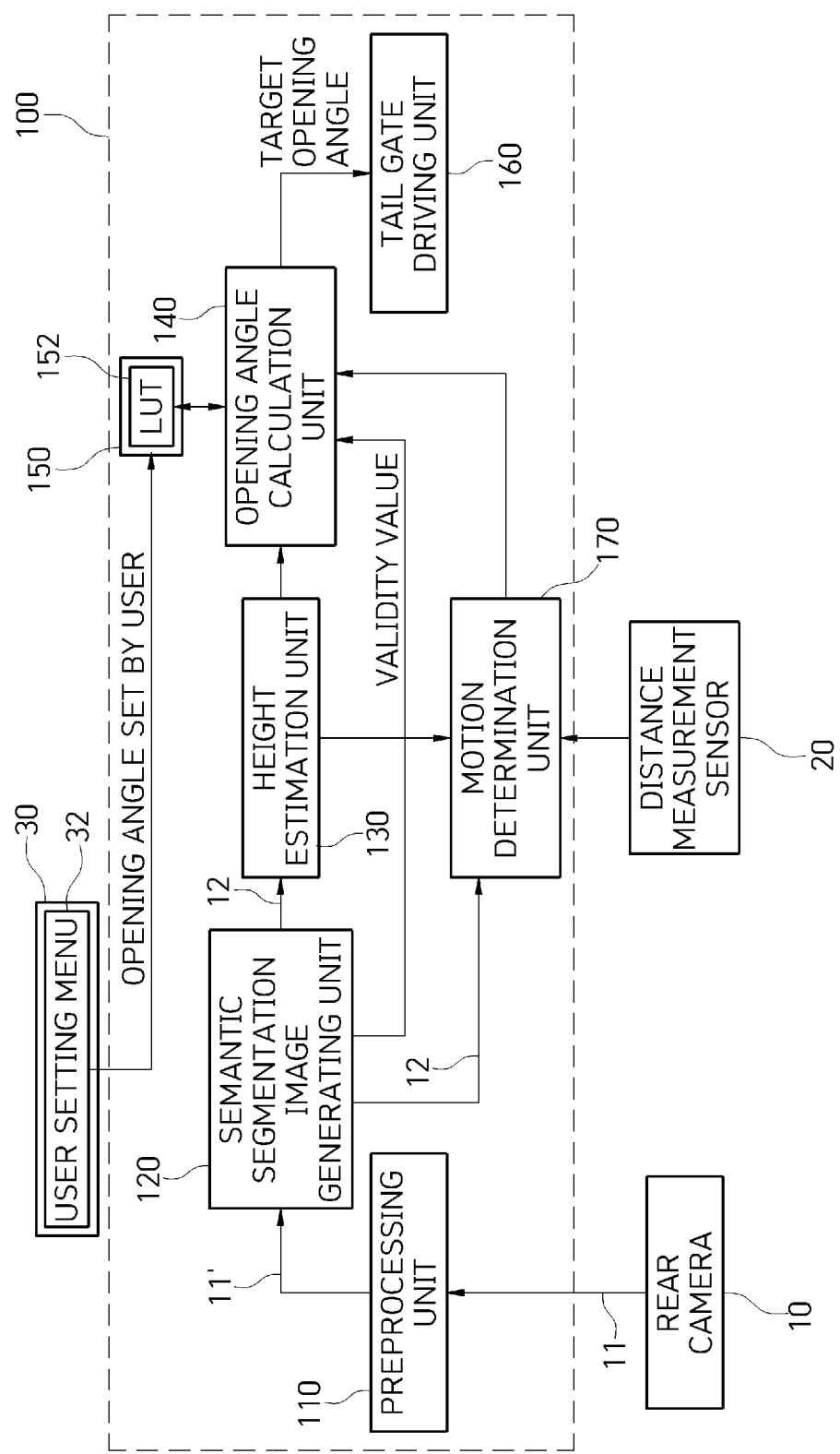
FIG. 1 is a block diagram illustrating a schematic configuration of an apparatus for opening and closing a tailgate of a vehicle according to an embodiment of the present invention.

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity. Like reference numerals refer to like elements throughout. Also, in providing description with reference to the drawings, although elements are represented by the same name, reference numeral referring to the elements may be changed, and reference numerals are merely described for convenience of description. It should not be construed that concepts, features, functions, or effects of elements are limited by reference numerals.

In an embodiment, the present invention may estimate a height of a user (e.g., driver, passenger, person standing near-by, etc.) by using a rear camera to automatically adjust the opening amount of the tailgate, so as to increase the convenience of an electrically-powered tailgate.

In another embodiment, the present invention may respectively convert rear camera images, which are obtained through photographing by a rear camera equipped in the tailgate and are temporally continuous, into temporally continuous semantic segmentation images by using a semantic segmentation neural network while a tailgate is being opened.

In another embodiment, the present invention may detect a head region of a user from each of the continuous semantic segmentation images and may analyze a position change of each of the detected head regions of the user to estimate (calculate) a height of the user.

In another embodiment, the present invention may pre-learn opening angles of a tailgate on the basis of a statistical height, which a hand of a user is capable of reaching, when the user raises an arm of the user to above a head, and may construct a lookup table where the pre-learned opening angles are mapped.

In another embodiment, the present invention may detect an opening angle, mapped to the estimated user height information, as a target opening angle from the lookup table with reference to the lookup table and may adjust the opening amount of the tailgate based on the detected target opening angle.

When a position of the user is changed in a process of estimating a height of a user, an estimated height may be rapidly changed, and a rapidly changed height may not be trusted.

In a case where a distance sensor is equipped in a vehicle, the distance sensor may sense a distance variation from the vehicle to a user, and when the distance variation occurs, the present invention may preferentially use a height calculated under a stable condition without using an estimated height.

In a case where a user is raising a hand or a number of users are shown in a semantic segmentation image, an uppermost region of the user shown in the semantic segmentation image may not be a head region of the user. In this case, the opening amount of a tailgate may be adjusted with reference to an opening angle set through a user setting menu by a user.

Hereinafter, embodiments of the present invention will be described in detail with reference to the accompanying drawings.

FIG. 1 is a block diagram illustrating a schematic configuration of an apparatus for opening and closing a tailgate of a vehicle according to an embodiment of the present invention.

Referring to FIG. 1, an apparatus for opening and closing a tailgate of a vehicle (or a tailgate system of a vehicle) 100 according to an embodiment of the present invention may be installed in a vehicle and may be implemented as a computing device.

Although not limited, the apparatus for opening and closing a tailgate of a vehicle (hereinafter referred to as a tailgate opening and closing apparatus) 100 implemented as a computing device may include a preprocessing unit 110, a semantic segmentation image generating unit 120, a height estimation unit 130, an opening angle calculation unit 140, a memory 150, a tailgate driving unit 160, and a motion determination unit 170, in a case where the tailgate opening and closing apparatus 100 is divided by function units.

Preprocessing 110

The preprocessing unit 110 may be implemented as a software module, a hardware module, or a combination thereof and may input a preprocessing image, obtained by preprocessing a rear camera image 11 input from a rear camera 10 by frame units, to the semantic segmentation image generating unit 120.

The rear camera 10 may be equipped in a tailgate of a vehicle, and for example, may not be a dedicated camera of the tailgate opening and closing apparatus 100 according to an embodiment of the present invention and may use a conventional camera equipped in a vehicle. For example, a camera cooperating with a parking assist system (PAS) equipped in a vehicle may be used.

In order to use the rear camera cooperating with the PAS, the rear camera 10 may be connected to the tailgate opening and closing apparatus 100 according to an embodiment of the present invention through a vehicle network communication bus. The vehicle network communication bus may be, for example, a controller area network (CAN) communication bus or a local interconnect network (LIN) communication bus.

When an operation of the PAS is completed, the vehicle network communication bus connecting the rear camera 10 to the tailgate opening and closing apparatus 100 according to an embodiment of the present invention may be activated, the tailgate opening and closing apparatus 100 may request a rear camera image 11 from the rear camera 10 through the activated vehicle network communication bus, and the rear camera 10 may transmit the rear camera image 11 to the preprocessing unit 110 of the tailgate opening and closing apparatus 100 in response to the request.

The tailgate opening and closing apparatus 100 according to an embodiment of the present invention may further include a communication interface (for example, a CAN communication interface or a LIN communication interface) for receiving the rear camera image 11 through the activated vehicle network communication bus, but for conciseness of illustration, a configuration of a communication interface is not illustrated in FIG. 1.

A preprocessing process performed by the preprocessing unit 110 may be a rectification process performed on the rear camera image 11 input from the rear camera 10.

Image rectification may be, for example, a process of converting the rear camera image into an image projected onto a virtual image plane. An image projected onto an image plane may be an image obtained by an ideal pin-hole (a center of a lens) camera. That is, the image rectification may be a process of converting the rear camera image into an image obtained by the ideal pin-hole camera. The present invention may not be characterized in an image rectification process, and thus, its detailed description may refer to technology known to those skilled in the art and may be omitted herein.

Semantic Segmentation Image Generating Unit 120

The semantic segmentation image generating unit 120 may be implemented as a software module, a hardware module, or a combination thereof and may generate a semantic segmentation image corresponding to a preprocessing image input from the preprocessing unit 110. The semantic segmentation image may be an image where all images included in the preprocessing image are labeled as two or more classes.

FIG. 2 is a diagram illustrating an example of a preprocessing image input to a semantic segmentation image generating unit illustrated in FIG. 1 and a semantic segmentation image output from the semantic segmentation image generating unit.

Referring to FIG. 2, a semantic segmentation image 12 generated (or converted) from a preprocessing image 11' obtained by preprocessing the rear camera image 11 may be classified into pixel sets labeled as two classes including a person region 12A and a background region 12B.

The person region (or a user region) 12A may include pixels having one same pixel value converted from pixels having different pixel values included in a person region 11A included in the preprocessing image 11'.

The background region 12B may be classified into a sky region 12B_1, a ground region 12B_2, and a road region 12B_3 in detail.

The sky region 12B_1 may include pixels having one same pixel value converted from pixels having different pixel values included in a sky region 11B_1 included in the preprocessing image 11'. The ground region 12B_2 may include pixels having one same pixel value converted from pixels having different pixel values included in a ground region 11B_2 included in the preprocessing image 11'. The road region 12B_2 may include pixels having one same pixel value converted from pixels having different pixel values included in a ground region 11B_2 included in the preprocessing image 11'.

In order to convert a preprocessing image into a semantic segmentation image, a deep learning neural network may be used. The deep learning neural network may be a neural network model which is pre-learned to perform an operation of classifying each pixel of the preprocessing image 11' into a specific object and designating each classified pixel as a label.

The deep learning neural network may be implemented as, for example, a semantic segmentation neural network including an encoder and a decoder, and the semantic segmentation neural network may be implemented, for example, based on a convolutional neural network (CNN).

Height Estimation Unit 130

Referring again to FIG. 1, the height estimation unit 130 may be implemented as a software module, a hardware module, or a combination thereof and may estimate a height of a user who desires to open or close the tailgate, based on (or by using) the semantic segmentation image input from the semantic segmentation image generating unit 120.

In order to estimate a height of the user, the height estimation unit 130 may perform a process of calculating a previous prediction line from a semantic segmentation image 12 of a previous frame, a process of calculating a current prediction line from a semantic segmentation image 12 of a current frame, and a process of calculating an intersection point between the previous prediction line and the current prediction line, and a process of calculating a height of the user from the calculated intersection point.

Herein, a prediction line may be used as the term representing a virtual straight line which connects position coordinates of a camera, disposed at a focal length "f" from an image plane (an image plane expressed in a pixel coordinate system) (70 of FIG. 6), to uppermost coordinates of the user region 12A included in the semantic segmentation image 12 projected onto the image plane. Here, the uppermost coordinates may be uppermost coordinates of a head region included in the user region 12A. For example, when there is a region (for example, a hand region) representing another body part of the user on the head region in the semantic segmentation image 12, uppermost coordinates of the body part region (for example, coordinates representing a fingertip) may not be used as coordinates for calculating a prediction line.

In the present invention, because a height of a user should be accurately estimated, a semantic segmentation image where a body part region is on a head region of the user may be excluded from an image used for estimating a height of the user.

Hereinafter, a method of calculating a prediction line by using the semantic segmentation image 12 will be described in detail. To help understand description, an open scenario of a tailgate according to an embodiment of the present invention will be described with reference to FIGS. 4 to 6.

Figure 5A:
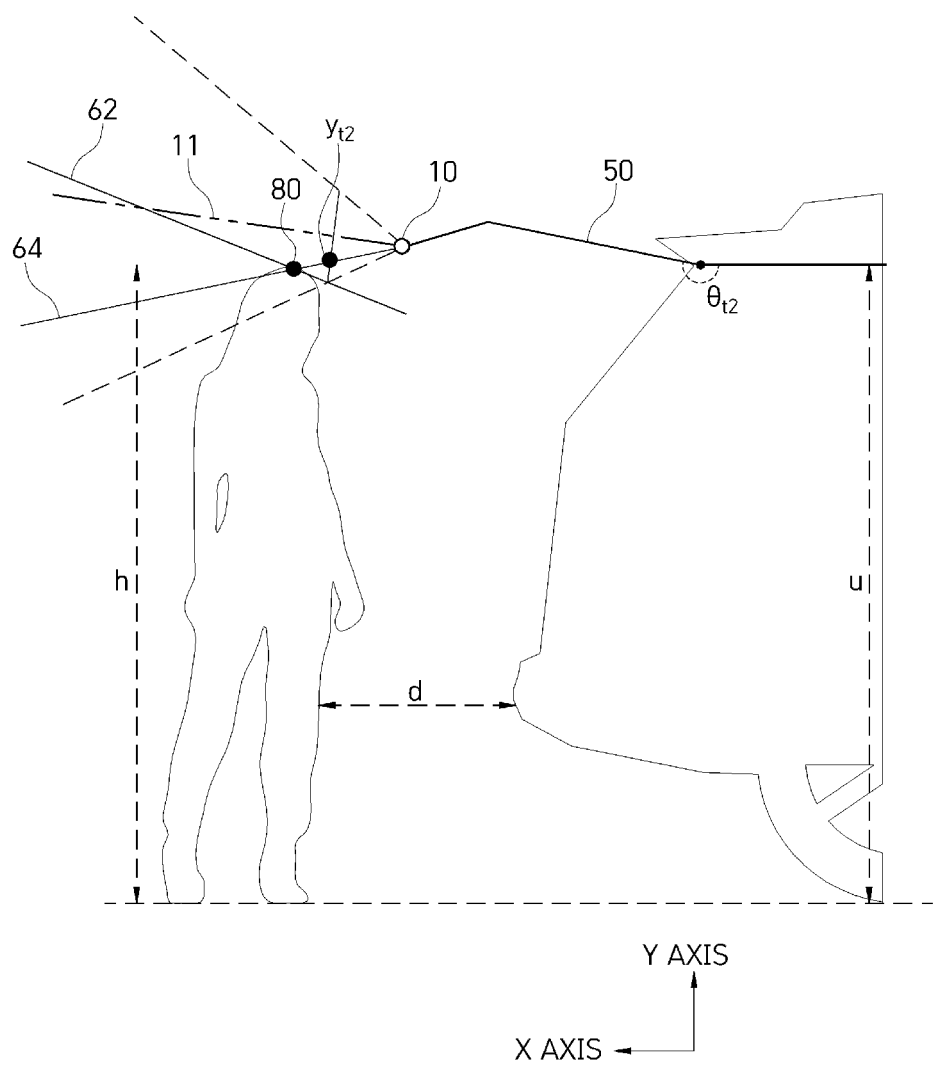
FIG. 5A is a diagram illustrating a user and a vehicle under a condition where an opening angle of a tailgate is $\theta_{t2}$, in an open scenario of a tailgate according to an embodiment of the present disclosure.
Figure 5B:
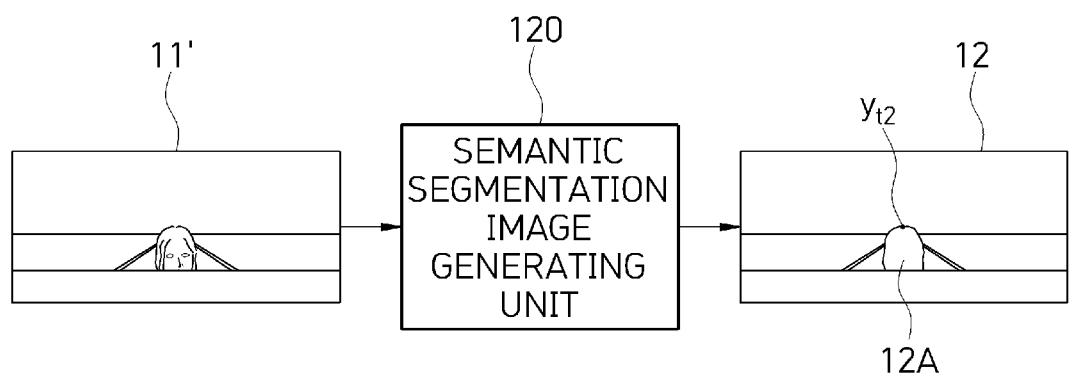
FIG. 5B is a diagram illustrating the semantic segmentation image generated by the semantic segmentation image generating unit illustrated in FIG. 1 under the condition of FIG. 5A.
Figure 6:
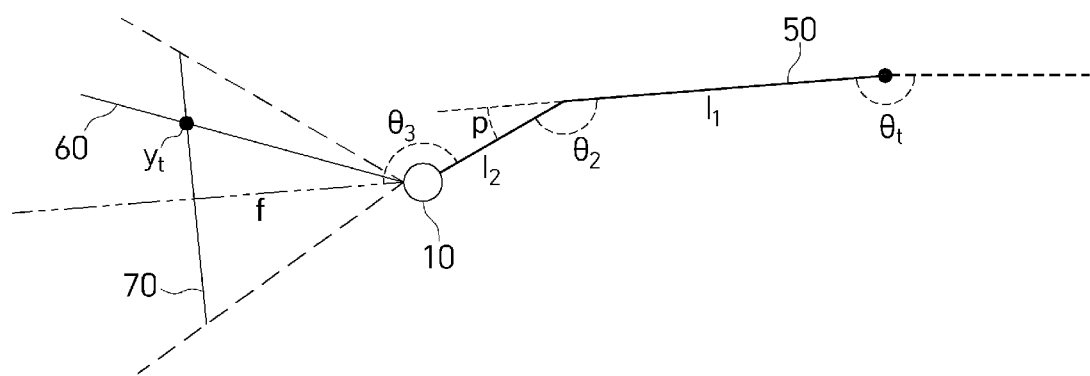
FIG. 6 is a diagram for describing a prediction line calculating method according to an embodiment of the present disclosure.

FIGS. 4 to 6 are diagrams illustrating an open scenario of a tailgate for describing a method of calculating a prediction line by using a semantic segmentation image according to an embodiment of the present invention.

Hereinafter, a method of calculating a prediction line by using a semantic segmentation image by frame units will be described, and in order to help understand description, an open scenario of a tailgate according to an embodiment of the present invention will be first described with reference to the drawings.

Figure 3A:
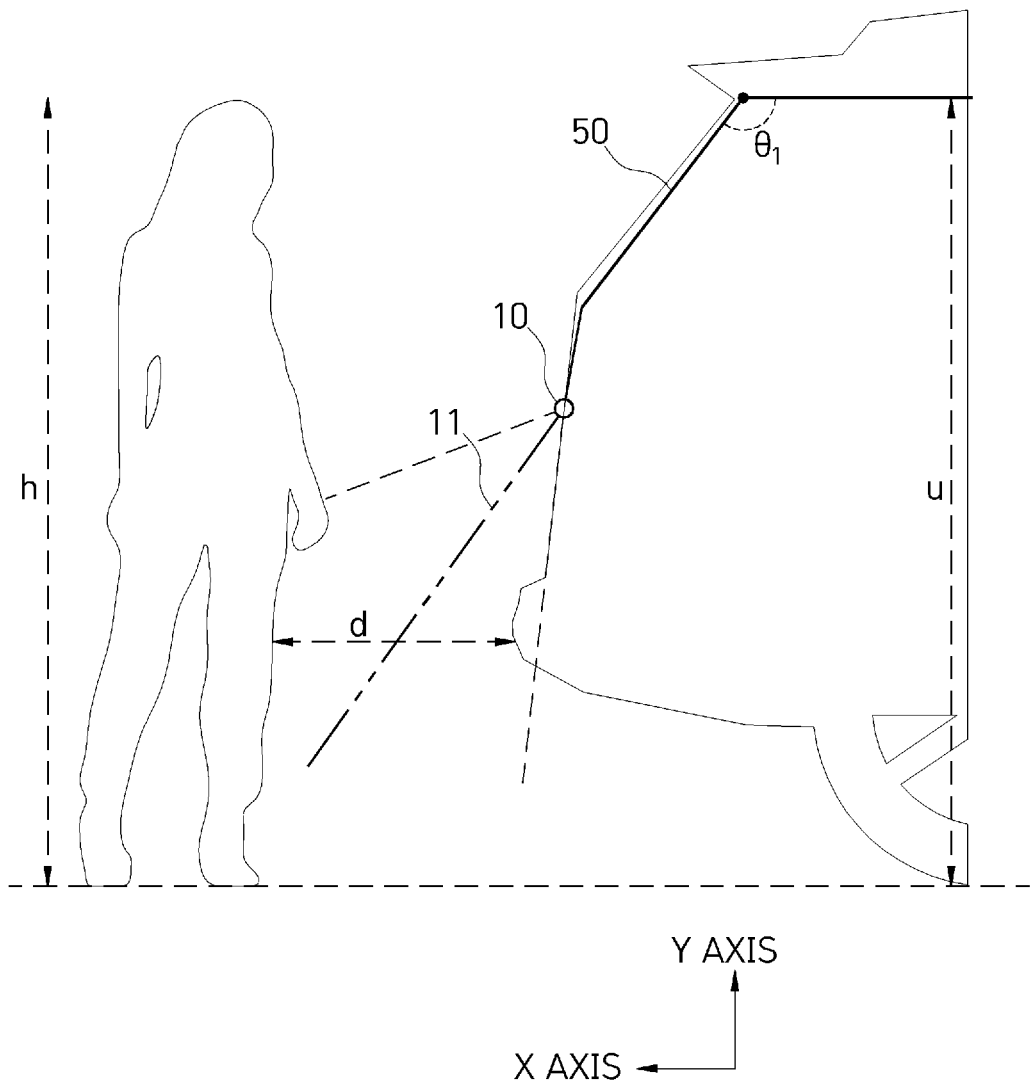
FIG. 3A is a diagram illustrating a user and a vehicle under a condition where an opening angle of a tailgate is $\theta_1$, in an open scenario of a tailgate according to an embodiment of the present disclosure.
Figure 3B:
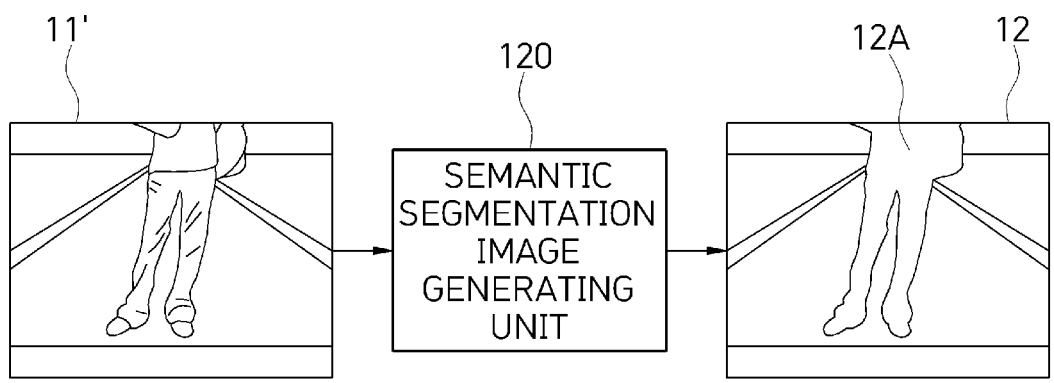
FIG. 3B is a diagram illustrating the semantic segmentation image generated by the semantic segmentation image generating unit illustrated in FIG. 1 under the condition of FIG. 3A.

FIG. 3A is a diagram illustrating a user and a vehicle under a condition where an opening angle of a tailgate is $\theta_1$, in an open scenario of a tailgate according to an embodiment of the present disclosure. FIG. 3B is a diagram illustrating the semantic segmentation image generated by the semantic segmentation image generating unit illustrated in FIG. 1 under the condition of FIG. 3A.

Referring to FIG. 3A, a condition where an opening angle of a tailgate 50 is $\theta_1$ is a condition where the tailgate 50 is completely closed. In this condition, an optical axis of a rear camera 10 equipped in the tailgate 50 faces the ground, and thus, as illustrated in FIG. 3B, only a lower body region of a person is shown in a semantic segmentation image 12 generated by a semantic segmentation image generating unit 120.

Figure 4A:
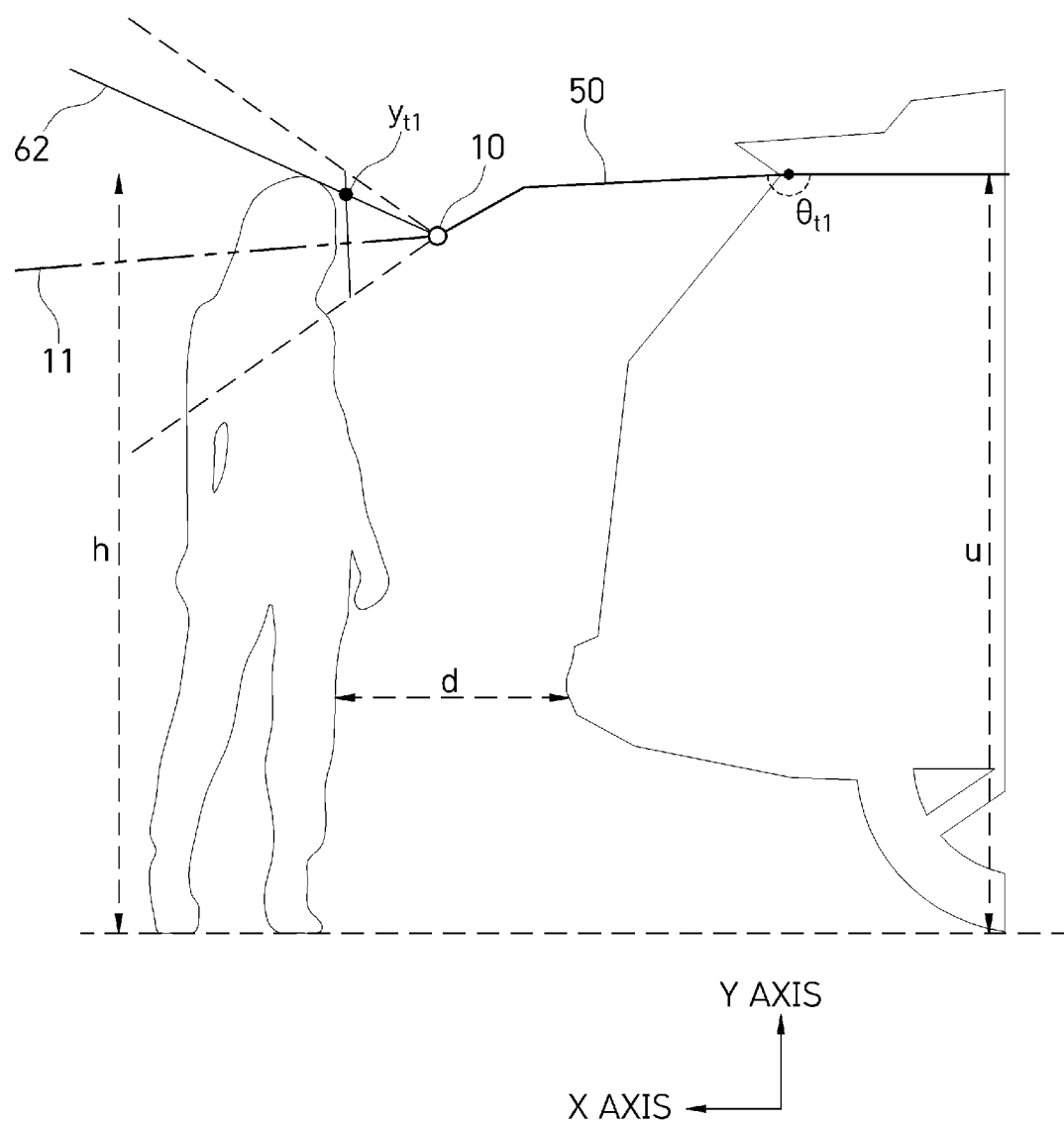
FIG. 4A is a diagram illustrating a user and a vehicle under a condition where an opening angle of a tailgate is $\theta_{t1}$, in an open scenario of a tailgate according to an embodiment of the present disclosure.
Figure 4B:
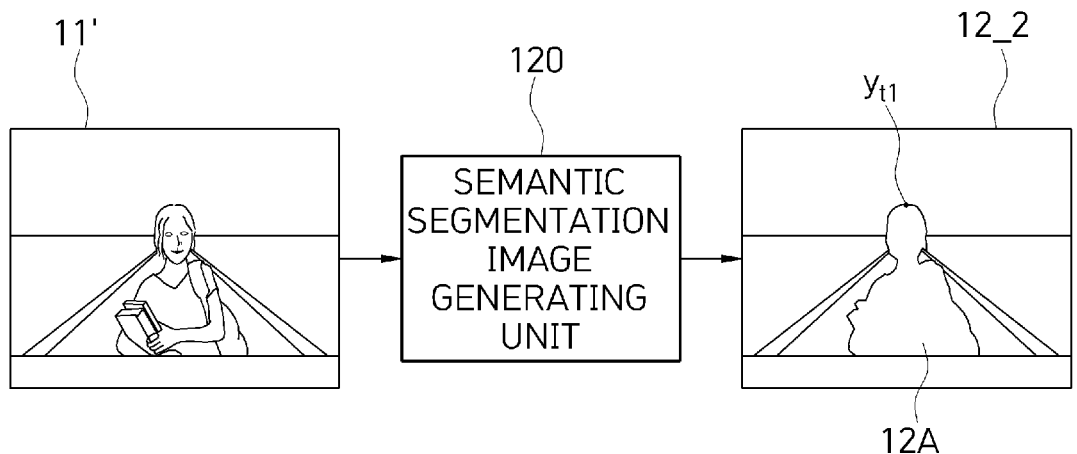
FIG. 4B is a diagram illustrating the semantic segmentation image generated by the semantic segmentation image generating unit illustrated in FIG. 1 under the condition of FIG. 4A.

FIG. 4A is a diagram illustrating a person and a vehicle under a condition where an opening angle of a tailgate is $\theta_{t1}$, in an open scenario of a tailgate according to an embodiment of the present disclosure. FIG. 4B is a diagram illustrating the semantic segmentation image generated by the semantic segmentation image generating unit illustrated in FIG. 1 under the condition of FIG. 4A.

Referring to FIG. 4A, under a condition where an opening angle of a tailgate 50 is $\theta_{t1}$, an optical axis of a rear camera 10 equipped in tailgate 50 faces a head of a user, and thus, as illustrated in FIG. 4B, an upper body region of the user including a head region of the user is shown in a semantic segmentation image 12 on the basis of a lens angle of view of the rear camera 10.

Therefore, in a case where the opening angle of the tailgate 50 is $\theta_{t1}$, pixel coordinates $y_{t1}$ corresponding to uppermost coordinates of the head region from the semantic segmentation image 12 may be detected.

FIG. 5A is a diagram illustrating a user and a vehicle under a condition where an opening angle of a tailgate is $\theta_{t2}$, in an open scenario of a tailgate according to an embodiment of the present disclosure. FIG. 5B is a diagram illustrating the semantic segmentation image generated by the semantic segmentation image generating unit illustrated in FIG. 1 under the condition of FIG. 5A.

Referring to FIG. 5A, under a condition where an opening angle of a tailgate 50 is $\theta_{t2}$, an optical axis 11 of a rear camera 10 equipped in a tailgate 50 faces a portion above a head of a user, but as illustrated in FIG. 5B, a portion of a head region of the user is shown in a semantic segmentation image 12 on the basis of a lens angle of view of the rear camera 10.

Therefore, in a case where the opening angle of the tailgate 50 is $\theta_{t2}$, pixel coordinates $y_{t2}$ corresponding to uppermost coordinates of the head region may be detected from the semantic segmentation image 12.

FIG. 6 is a diagram for describing a prediction line calculating method according to an embodiment of the present disclosure.

Referring to FIG. 6, when a lens angle of view of a rear camera 10 is $\Phi$, a focal length is f, and the number of pixels corresponding to a vertical length of a semantic segmentation image 12 is Y, a physical size "$\alpha$" of one pixel may be calculated as expressed in the following Equation 1.

$$\frac{\alpha 0.5Y}{f} = \tan(0.5\phi) \qquad \text{[Equation 1]}$$

$$\alpha = \frac{f}{0.5Y}\tan(0.5\phi)$$

As illustrated in FIG. 6, when an opening angle of a current tailgate is $\theta_t$, position coordinates ($x_{cam}$, $y_{cam}$) of a rear camera (or a pin-hole) 10 may be calculated as expressed in the following Equation 2. Here, an x-axis direction is a distance axis between a user and a vehicle, and a y-axis direction is a height direction.

$$\rho = 2\pi - \theta_t - \theta_2$$

$$x_{cam,t} = l_1 \cos(2\pi - \theta_t) - l_2 \cos\rho$$

$$y_{cam,t} = u + l_1 \sin(2\pi - \theta_t) - l_2 \sin\rho \qquad \text{[Equation 2]}$$

When y axis pixel coordinates corresponding to uppermost coordinates of a head region in a semantic segmentation image is $y_t$, a prediction line 60 starting from a rear camera 10 passes through an image plane 70 onto which a semantic segmentation image 12 is projected.

A point ($x_{im, t}$, $y_{im, t}$) at which the prediction line 60 intersects with the image plane 70 may be calculated as expressed in the following Equation 3.

$$\chi_t = \tan^{-1}\frac{\alpha(y_t - 0.5Y)}{f} \qquad \text{\{Equation 3\}}$$

$$x_{im,t} = x_{cam} + \frac{f}{\cos\chi_t}\cos(\theta_3 + \rho + \chi_t)$$

$$y_{im,t} = y_{cam} - \frac{f}{\cos\chi_t}\sin(\theta_3 + \rho + \chi_t)$$

The position coordinates ($x_{cam}$, $y_{cam}$) of the rear camera 10 may be calculated as expressed in the following Equation 2 and the point ($x_{im, t}$, $y_{im, t}$) at which the prediction line 60 intersects with the image plane 70 may be calculated as expressed in the following Equation 3, and thus, a rectilinear equation representing the prediction line 60 may be calculated.

Based on such a calculation equation, the height estimation unit 130 may calculate a previous prediction line (62 of FIGS. 4A and 5A) by using a semantic segmentation image 12 of a previous frame obtained under a condition (FIG. 4A)

where an opening angle of a tailgate 50 is $\theta_{t1}$ and may calculate a current prediction line (64 of FIG. 5A) by using a semantic segmentation image 12 of a current frame obtained under a condition (FIG. 5A) where an opening angle of a tailgate 50 is $\theta_{t2}$.

Subsequently, the height estimation unit 130 may calculate position coordinates of an intersection point (80 of FIG. 5A) between the calculated previous prediction line (62 of FIGS. 4A and 5A) and the current prediction line (64 of FIG. 5A) and may calculate a height of a user (h of FIGS. 3A, 4A, and 5A) by using the calculated position coordinates of the intersection point.

Reference sign 'd' which is not described in FIGS. 3A, 4A, and 5A may represent a distance between a user and a vehicle (for example, a rear bumper).

Opening Angle Calculation Unit 140

Referring again to FIG. 1, the opening angle calculation unit 140 may calculate a target opening angle by using a height estimated (calculated) by the height estimation unit 130. For example, the opening angle calculation unit 140 may calculate the target opening angle with reference to a lookup table (LUT) 152 stored in the memory 150.

Based on an arm length proportional to a height of a person, the lookup table 152 may store a plurality of opening angles which are learned so that a closing button of a tailgate is disposed at a statistical height which a hand of a person is capable of stably reaching.

The opening angle calculation unit 140 may detect an opening angle mapped to a height of a user input from the height estimation unit 130 with reference to the lookup table 152 and may output the detected opening angle as a target opening angle to the tailgate driving unit 160.

The memory 150 storing the lookup table 152 may include a volatile memory and a non-volatile memory, and in addition to the lookup table 152, a default opening angle or an opening angle, set by a user through a user setting menu 32 displayed (provided) through the display device 30 of a vehicle, may be further stored in the memory 150.

The opening angle calculation unit 140 may determine whether the height of the user estimated (calculated) by the height estimation unit 130 is reliable information, and when it is determined that the height of the user is unreliable information, the opening angle calculation unit 140 may read the default opening angle or the opening angle (set by the user) stored in the memory 150, and then, may output the read default opening angle or opening angle (set by the user) as a target opening angle.

In an embodiment, the reliability of a height of a user may be determined based on a validity value provided by the semantic segmentation image generating unit 120.

The semantic segmentation image generating unit 120 may analyze the generated semantic segmentation image to sense a plurality of user regions in the semantic segmentation image, and when there is an arm region above a head region of a user region, the semantic segmentation image generating unit 120 may determine that a corresponding semantic segmentation image is not valid for an image for estimating a height of the user and may transfer a validity value, corresponding to a result of the determination, to the opening angle calculation unit 140.

When a plurality of user regions is sensed in a semantic segmentation image, a target user where a height of the user is to be estimated may not be specified, and thus, a height estimated based on a semantic segmentation image including a plurality of user regions may be unreliable information.

Moreover, when an arm region above a head region of a user region is sensed in a semantic segmentation image, the height estimation unit 130 may estimate a height of a user by using uppermost coordinates of the arm region instead of the head region, and thus, a height estimated based on a semantic segmentation image may be unreliable information.

In a case where the semantic segmentation image generating unit 120 is implemented as a deep learning neural network such as a semantic segmentation neural network or a CNN, another neural network which determines a result value (for example, an output value of an encoder configuring the semantic segmentation neural network or the CNN) generated in an intermediate processing process of the deep learning neural network or a result value of a decoder configuring the semantic segmentation neural network or the CNN) generated in a final processing process may be further added to the deep learning neural network, and thus, the validity value may be obtained.

In another embodiment, the reliability of a height of a user may be determined based on whether a motion of the user occurs. For example, when a distance (d of FIGS. 3A, 4A, and 5A) between the user and a rear bumper at a time at which a semantic segmentation image of a previous frame differs from a distance (d of FIGS. 3A, 4A, and 5A) between the user and the rear bumper at a time at which a semantic segmentation image of a current frame, a height calculated based on a previous prediction line calculated by using a previous semantic segmentation image and a current prediction line calculated by using a current semantic segmentation image may be unreliable.

In an embodiment of the present invention, a process of predicting a motion of a user by using the motion determination unit 170 may be performed.

Motion Determination Unit 170

In an embodiment, the motion determination unit 170 may compare a previously estimated height "$h_1$" of a user, input from the height estimation unit 130, with a currently estimated height "$h_2$" of the user input from the height estimation unit 130, and when $|h_1-h_2| \geq$ threshold value "$h_{th}$", the motion determination unit 170 may determine that a motion of the user occurs and may transfer a result of the determination to the opening angle calculation unit 140.

Based on the determination result, the opening angle calculation unit 140 may read the opening angle set by the user or the default opening angle stored in the memory 150, and then, may output the read opening angle or default opening angle as a target opening angle. That is, the opening angle calculation unit 140 may not calculate an opening angle, mapped to the currently estimated height "$h_2$" of the user detected from the lookup table 152, as the target opening angle and may calculate the opening angle set by the user or the default opening angle as the target opening angle.

Moreover, for example, the previously estimated height $h_1$ of the user may be a height which is calculated based on an intersection point (for example, 80 of FIG. 5A) between a first prediction line estimated by using a semantic segmentation image of a first frame and a second prediction line estimated by using a semantic segmentation image of a second frame. Also, the currently estimated height $h_2$ of the user may be a height which is calculated based on an intersection point between the second prediction line estimated by using the semantic segmentation image of the second frame and a third prediction line estimated by using a semantic segmentation image of a third frame (for example, 80 of FIG. 5A).

In another embodiment, the motion determination unit 170 may determine a motion of the user by using a distance value measured by a distance measurement sensor 20 which measures a distance from a rear bumper of a vehicle to the user. Here, for example, the distance measurement sensor 20 may be an ultrasonic sensor equipped in the rear bumper of the vehicle.

The motion determination unit 170 may compare a distance value "$d_1$", provided by the distance measurement sensor 20 at a time at which the height estimation unit 130 estimates the previous height "$h_1$" of a user, with a distance value "$d_2$" provided by the distance measurement sensor 20 at a time at which the height estimation unit 130 estimates the current height "$h_2$", and when $|d_1-d_2| \geq$ threshold value "$d_{th}$", the motion determination unit 170 may determine that a motion of the user occurs and may transfer a result of the determination to the opening angle calculation unit 140. Subsequently, like the embodiment described above, the opening angle calculation unit 140 may not output an opening angle, mapped to the currently estimated height "$h_2$" of the user detected from the lookup table 152, as the target opening angle and may output the opening angle set by the user or the default opening angle as the target opening angle.

Regardless of the motion of the user, when a distance value in a y-axis direction between an uppermost point ($y_{t1}$ of FIG. 4A) of the head region in a semantic segmentation image of a previous frame (hereinafter referred to as a previous semantic segmentation image) and an uppermost point ($y_{t2}$ of FIG. 5A) of the head region in a semantic segmentation image of a current frame (hereinafter referred to as a current semantic segmentation image) is excessively small, it may be difficult to calculate an accurate intersection point between a previous prediction line (62 of FIG. 5A) and a current prediction line (64 of FIG. 5A), and thus, in this case, the estimated height of the user may be unreliable.

Therefore, in another embodiment of the present invention, when the distance value in the y-axis direction between the uppermost point ($y_{t1}$ of FIG. 4A) of the head region in the previous semantic segmentation image and the uppermost point ($y_{t2}$ of FIG. 5A) of the head region in the current semantic segmentation image is less than a threshold value, the opening angle calculation unit 140 may output the opening angle set by the user or the default opening angle as the target opening angle, like the embodiment described above.

A process of comparing the threshold value with the distance value in the y-axis direction may be performed by the height estimation unit 130, and in this case, the height estimation unit 130 may output state information, representing that the distance value in the y-axis direction is less than the threshold value, to the opening angle calculation unit 140, instead of stopping a process of estimating a height of the user by using the previous semantic segmentation image and the current semantic segmentation image. The opening angle calculation unit 140 may output the opening angle set by the user or the default opening angle as the target opening angle in response to the state information.

Tailgate Driving Unit 160

The tailgate driving unit 160 may be an element which adjusts the opening amount of the tailgate based on the target opening angle input from the opening angle calculation unit 140. Although not shown, for example, the tailgate driving unit 160 may include a motor controller, which generates a motor control value corresponding to the target opening angle, and an electrical motor which generates a rotational force for controlling an opening operation and a closing operation of the tailgate based on the motor control value.

The elements 110, 120, 130, 140, 150, 160, and 170 included in the tailgate opening and closing apparatus 100 of a vehicle described above may be merely divided by function units so as to help understand description, and the tailgate opening and closing apparatus 100 may be designed with fewer or more blocks.

For example, the preprocessing unit 110, the semantic segmentation image generating unit 120, the height estimation unit 130, the opening angle calculation unit 140, and the motion determination unit 170 may be integrated into a unit configured with one central processing unit (CPU), one graphics processing unit (GPU), or a combination thereof. In this case, processes respectively performed by the elements 110, 120, 130, 140, and 170 may be programmed in an algorithm form and may be stored in a memory or a hard disk and may be read and executed by one CPU, one GPU, or a combination thereof.

In another embodiment, the preprocessing unit 110 and the semantic segmentation image generating unit 120 may be integrated into one element, and the height estimation unit 130 and the opening angle calculation unit 140 may also be integrated into one element. In another embodiment, the height estimation unit 130, the opening angle calculation unit 140, and the motion determination unit 170 may be integrated into one element.

Figure 7:
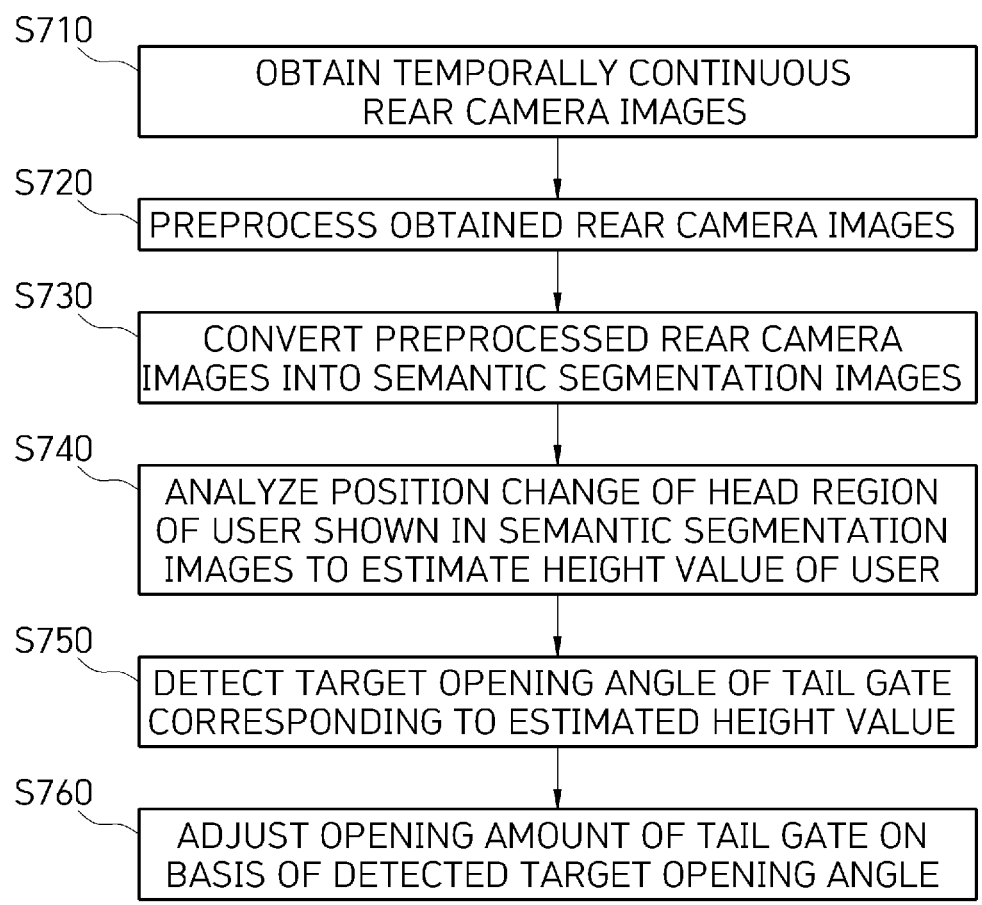
FIG. 7 is a flowchart illustrating a method of opening and closing a tailgate of a vehicle according to an embodiment of the present disclosure.

FIG. 7 is a flowchart illustrating a method of opening and closing a tailgate of a vehicle according to an embodiment of the present disclosure.

Referring to FIG. 7, first, in step S710, a process of obtaining temporally continuous rear camera images may be performed. For example, while the tailgate 50 is being opened, a rear camera (FIGS. 3A, 4A, and 5A) equipped in the tailgate of a vehicle may photograph a user disposed in front of the tailgate 50, and thus, rear camera images 11 may be obtained by frame units.

Subsequently, in step S720, a process of preprocessing the obtained rear camera images 11 may be performed. In an embodiment, a preprocessing process may be a process of converting the rear camera images into an image obtained by the ideal pin-hole camera through image signal processing (ISP) and an image rectification process so as to minimize an adverse effect caused by the spec of the rear camera 10. In another embodiment, the preprocessing process may be a process of projecting the rear camera images onto a virtual image plane expressed in a pixel coordinate system.

Subsequently, in step S730, a process of respectively converting the preprocessed rear camera images into semantic segmentation images may be performed. In order to perform such a process, for example, the deep learning neural network such as the semantic segmentation neural network or the CNN may be used.

Subsequently, in step S740, a process of analyzing a position change of a head region of the user shown in the semantic segmentation images to estimate a height of the user may be performed.

For example, the position change of the head region may be analyzed through position changes of uppermost coordinates ($y_{t1}$ of FIG. 4 and $y_{t2}$ of FIG. 5A) of the head region in an image plane onto which each semantic segmentation image is projected.

In another embodiment, the position change of the head region may be analyzed through a position change of a prediction line passing through the uppermost coordinates ($y_{t1}$ of FIG. 4 and $y_{t2}$ of FIG. 5A).

In another embodiment, a process of analyzing the position change of the head region may be a process of comparing and analyzing a position of the head region of the user shown in a semantic segmentation image of a previous frame and a position of the head region of the user shown in a semantic segmentation image of a current frame among the semantic segmentation images.

In another embodiment, a process of analyzing the position change of the head region may be a process of calculating a previous prediction line (62 of FIG. 4A) from the semantic segmentation image of the previous frame among the semantic segmentation images, a process of calculating a current prediction line (64 of FIG. 5A) from the semantic segmentation image of the current frame temporally succeeding the previous frame among the semantic segmentation images, and a process of analyzing the position change of the head region of the user by using the previous prediction line and the current prediction line.

Here, each of the previous prediction line and the current prediction line may be a virtual straight line which connects uppermost coordinates of the head region to position coordinates of the rear camera disposed at a focal length from an image plane, in the image plane onto which semantic segmentation images are projected.

In another embodiment, an estimated height of the user may be calculated from an intersection point (80 of FIG. 5A) between the previous prediction line (62 of FIG. 4A) and the current prediction line (64 of FIG. 5A).

Subsequently, in step S750, a process of detecting a target opening angle of the tailgate corresponding to the estimated height of the user may be performed. In an embodiment, the process of detecting the target opening angle may be a process of detecting an opening angle, mapped to the estimated height of the user among a plurality of pre-learned opening angles, as the target opening angle with reference to a lookup table which stores the plurality of pre-learned opening angles.

Here, for example, the lookup table may be a table which stores the plurality of pre-learned opening angles based on a statistical height which a hand of a user is capable of reaching, when the user raises an arm of the user to above a head.

Subsequently, in step S760, a process of adjusting the opening amount of the tailgate based on the detected target opening angle may be performed.

The method of opening and closing a tailgate of a vehicle according to an embodiment of the present invention may further include a process of sensing a distance change between the user and the vehicle, between step S740 and step S750. At this time, when the distance change is sensed, the target opening angle corresponding to the estimated height of the user may not be detected, and a process of detecting an opening angle, set through a user setting menu provided through a display device by the user, as the target opening angle may be performed.

According to the embodiments of the present invention, because a user adjusts the opening amount of a tailgate based on a height of the user, a problem may be solved where a user should readjust the opening amount of the tailgate set by a different user. Particularly, according to the embodiments of the present invention, convenience may be maximized at a workplace where a number of users share one vehicle.

Figure 8:
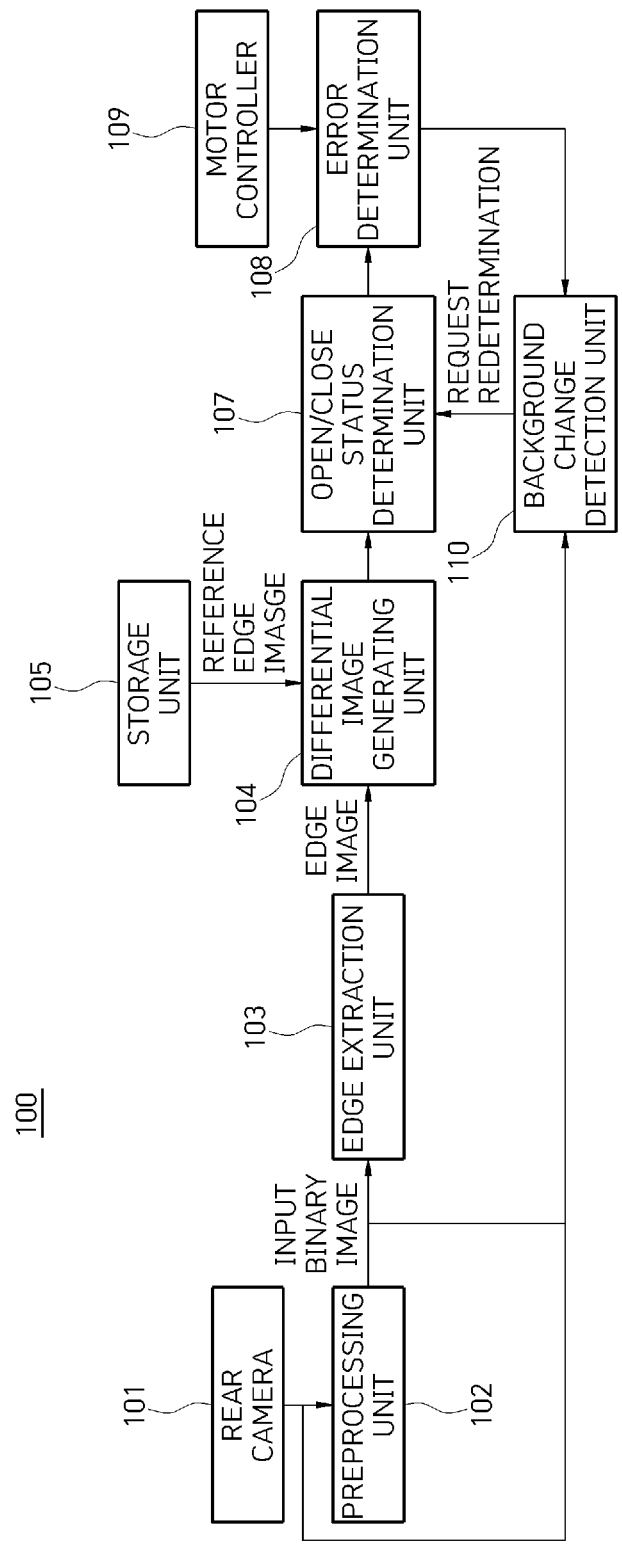
FIG. 8 is a block diagram illustrating an open/close status of a tailgate based on a rear camera image according to another embodiment of the present invention.

FIG. 8 is a block diagram illustrating an open/close status of a tailgate based on a rear camera image according to another embodiment of the present invention.

An apparatus for sensing an open/close status of a tailgate based on a rear camera image according to another embodiment of the present invention may sense an open/close status of a tailgate by using a rear camera equipped in a vehicle so as to assist parking and driving, and at this time, may sense an open/close status of a trunk by using a rear camera image obtained by photographing a rear bumper.

An apparatus for determining an open/close status of a tailgate may compare an edge (hereinafter referred to as a reference edge) of a rear bumper, included in a reference rear camera image obtained by previously photographing a rear bumper in a state where the tailgate is closed, with a current edge of the rear bumper included in the rear camera image obtained by currently photograph the rear bumper at a current time in a situation where an open/close status of a trunk should be sensed.

For example, when a position of the reference edge is the same as or adjacent to a position of the current edge in a screen, the apparatus for determining an open/close status of a tailgate may determine a trunk state as a closed state, and when a position of the reference edge differs from a position of the current edge in the screen, the apparatus for determining an open/close status of a tailgate may determine a trunk state as an opened state.

In order to determine whether the reference edge is the same as or different from the current edge, a differential image between the reference rear camera image and the current rear camera image may be used. This will be described below.

Moreover, because the apparatus for determining an open/close status of a tailgate does not accurately detect an edge of the rear bumper from the rear camera image due to a shadow caused by a peripheral obstacle, the apparatus for determining an open/close status of a tailgate may provide a process of predicting a situation, where an open/close status of the tailgate is abnormally determined, and again detecting the edge of the rear bumper on the basis of a result of the prediction to again determine the open/close status of the tailgate, in order to respond to a situation where the open/close status of the tailgate is abnormally determined. This will be described below.

Referring to FIG. 8, in order to determine an open/close status of a tailgate, an apparatus 100 for determining an open/close status of a tailgate may include a rear camera 101, a preprocessing unit 102, an edge extraction unit 103, a differential image generating unit 104, a storage unit 105, an open/close status determination unit 107, an error determination unit 108, a motor controller 109, and a background change detection unit 110.

The rear camera 101 may be equipped in a tailgate (or a trunk lid). The rear camera 101 equipped in the tailgate may photograph a rear bumper of a vehicle (hereinafter referred to as a bumper) to obtain a rear camera image.

Figure 9A:
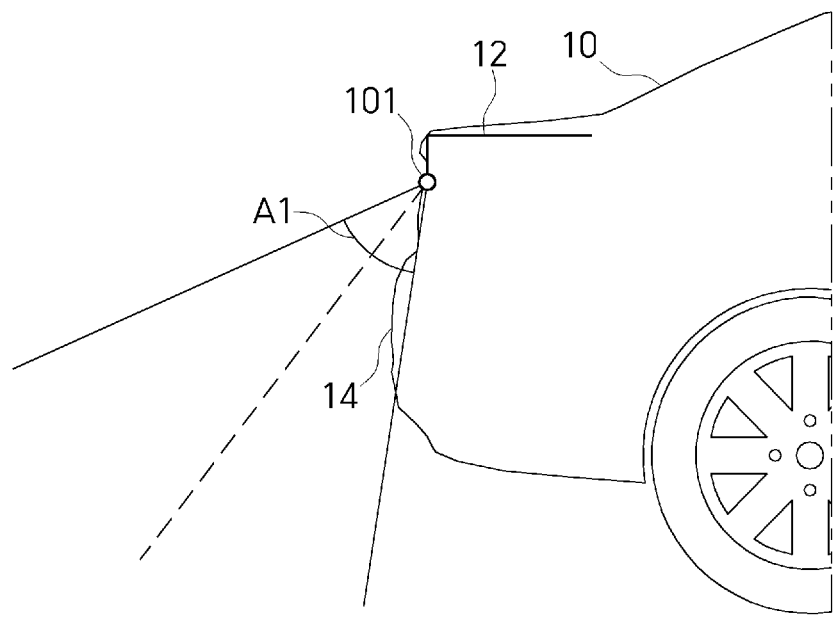
FIGS. 9A and 9B are diagrams illustrating a lens angle of view of a rear camera illustrated in FIG. 8.
Figure 9B:
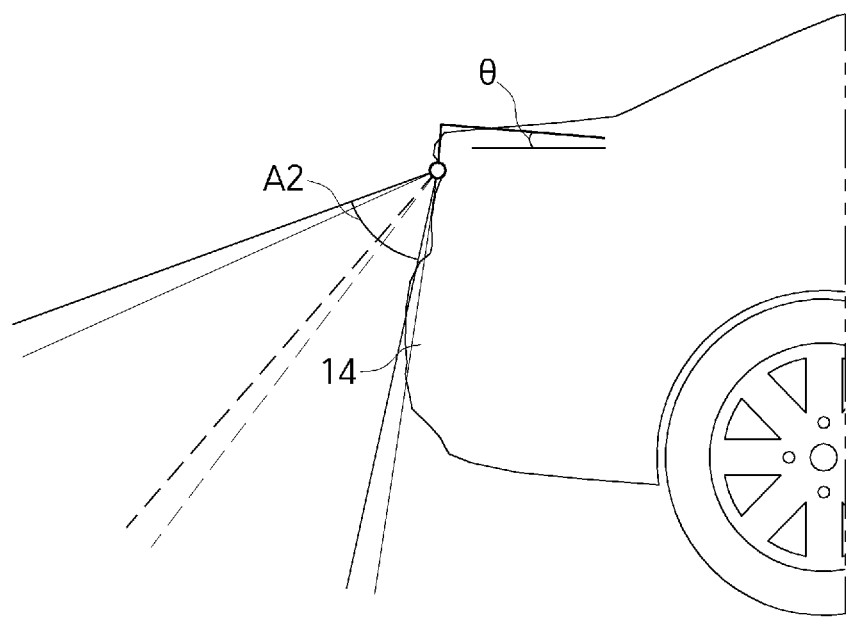

FIGS. 9A and 9B are diagrams illustrating a lens angle of view of the rear camera 101 illustrated in FIG. 8.

In FIG. 9A, a lens angle of view A1 of a rear camera 101 equipped in a tailgate 12 in a state where the tailgate 12 is closed (i.e., when an opening angle of the tailgate 12 is 0 degrees) is illustrated. In FIG. 9B, a lens angle of view A2 of the rear camera 101 equipped in the tailgate 12 in a state where the tailgate 12 is finely opened (i.e., when an opening angle "Θ" of the tailgate 12 is 1 degree) is illustrated.

When the tailgate 12 is opened by an opening angle of 1 degree, as illustrated in FIG. 9B, a lens angle of view of the rear camera 101 may rotate and move in an upward direction by the opening angle (for example, 1 degree) of the tailgate 12.

Therefore, in the same screen, there may be a fine difference between a position of an edge of the rear bumper 14, shown in a rear camera image obtained through photographing by the rear camera 101 in a state where the tailgate 12 is closed, and a position of an edge of the rear bumper 14 shown in a rear camera image obtained through photographing by the rear camera 101 in a state where the tailgate 12 is opened.

According to another embodiment of the present invention, an apparatus for determining an open/close status of a tailgate 12 may set an edge of the rear bumper 14, shown in a rear camera image obtained in a state where the tailgate 12 is closed, to a reference edge and may compare the reference edge with an edge of the rear bumper 14 shown in a rear camera image obtained in a state where the tailgate 12 is opened, thereby determining an open/close status of the tailgate 12.

Referring again to FIG. 8, the preprocessing unit 102 may convert the rear camera image, input from the rear camera 101, into an input binary image consisting of a gray scale based on a preprocessing process.

The edge extraction unit 103 may search for an edge of a bumper object by using a search window in the input binary image input from the preprocessing unit 102 and may extract the found edge of the bumper object as an edge image. Here, a canny edge detection and/or a suitable edge extraction algorithm may be used for extracting the edge image. The edge image may be detected from the input binary image, and thus, may also be a binary image consisting of a gray scale.

The search window may be appropriately set to have a certain size so that an edge of another object other than the edge of the bumper object is not detected. Accordingly, only the edge of the bumper object may be shown in an edge image detected by using the search window.

Figure 10:
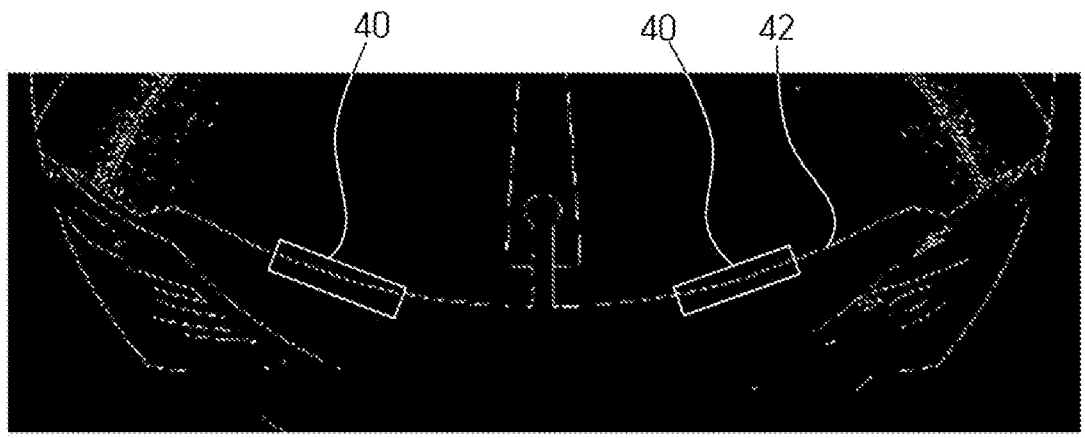
FIG. 10 is a diagram for describing an input binary image generated by a preprocessing unit illustrated in FIG. 8 and a search window set in the input binary image.

FIG. 10 is a diagram for describing an input binary image generated by the preprocessing unit illustrated in FIG. 8 and a search window set in the input binary image. As illustrated in FIG. 10, the search window may be set to have a rectangular box shape to smoothly search for an edge 42 of a bumper object.

Referring again to FIG. 8, the differential image generating unit 104 may generate a differential image between an input edge image input from the edge extraction unit 103 and the reference edge image input from the storage unit 105.

Figure 11:
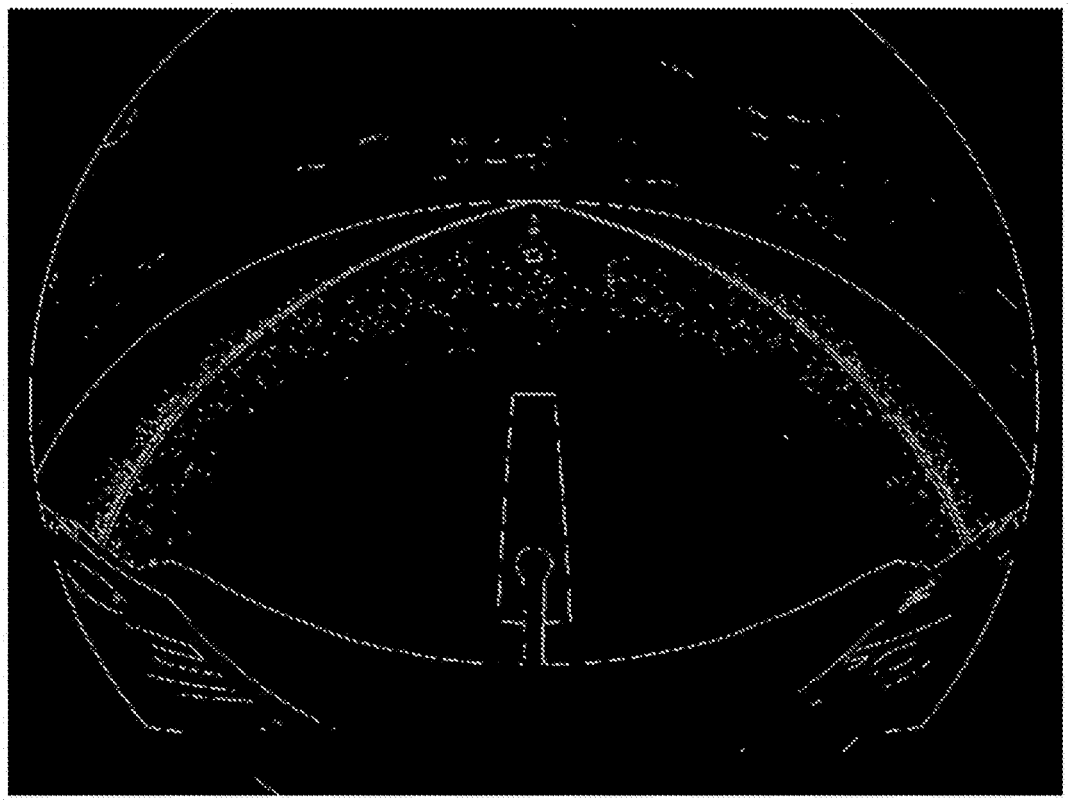
FIG. 11 illustrates an example where a reference edge image is shown.

The reference edge image may be a binary image obtained in a vehicle manufacturing step and may be an edge image which is extracted from a rear camera image, obtained by previously photographing a bumper (a rear bumper) of a vehicle, through the same processes as a preprocessing process and an edge extraction process described above. That is, the reference edge image may include an edge of a bumper captured by the rear camera equipped in the tailgate when an opening angle of the tailgate is 0 degrees. In FIG. 11, an example of a reference edge image is shown. Each of the input edge image and the reference edge image may be a binary image, and thus, the differential image may also be a binary image.

When the input binary image is EdgeInput(x, y) and the reference edge image is EdgeReference(x, y), a differential image may be expressed as an equation "|EdgeInput(x, y)−EdgeReference(x', y')|." Here, (x, y) may be arbitrary pixel coordinates in the input edge image, and (x', y') may be pixel coordinates corresponding to (x, y) in the reference edge image. Also, || may be a sign which represents an absolute value of a difference value between EdgeInput(x, y) and EdgeReference(x', y').

The determination unit 107 may calculate the number of pixels having a pixel value (a value of '0' or '1') representing an edge in the differential image input from the differential image generating unit 104 and may determine an open/close status of a tailgate based on the calculated number of pixels.

For example, when the calculated number of pixels is greater than a threshold value, the determination unit 107 may determine that the tailgate is in an opened state, and otherwise, the determination unit 107 may determine that the tailgate is in a closed state.

Figure 12:
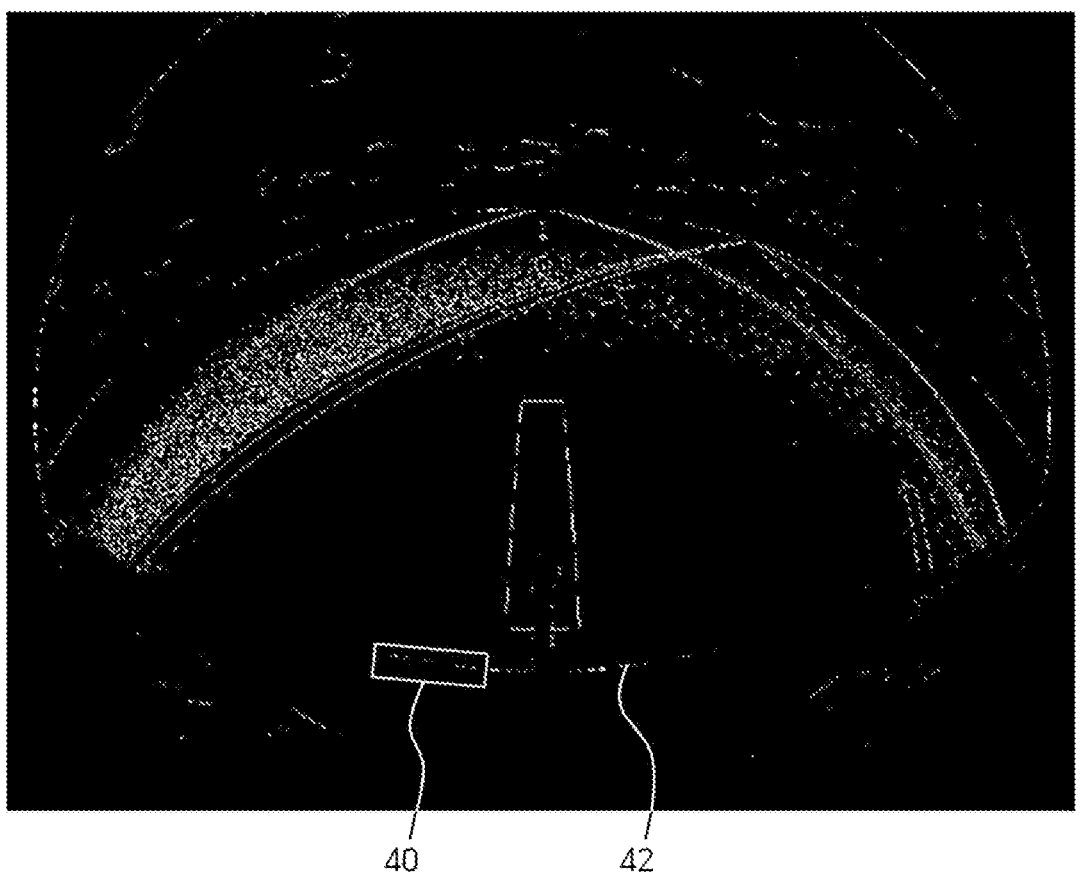
FIG. 12 is a diagram showing a differential image between an input edge image and a reference edge image when the input edge image is accurately extracted in a state where a tailgate according to an embodiment of the present invention is actually closed.

FIG. 12 is a diagram showing a differential image between an input edge image and a reference edge image when the input edge image is accurately extracted in a state where a tailgate according to an embodiment of the present invention is actually closed.

Referring to FIG. 12, as described above, the reference edge image may be an image which is previously obtained in a state where the tailgate is closed. Therefore, when a differential image between the reference edge image and an input edge image extracted in a state where the tailgate is closed is generated, a partial edge may be shown in a region where an edge should be shown, in the generated differential image. In this case, the number of pixels representing the partial edge may be less than the number of pixels representing an edge shown in the reference edge image.

Figure 13:
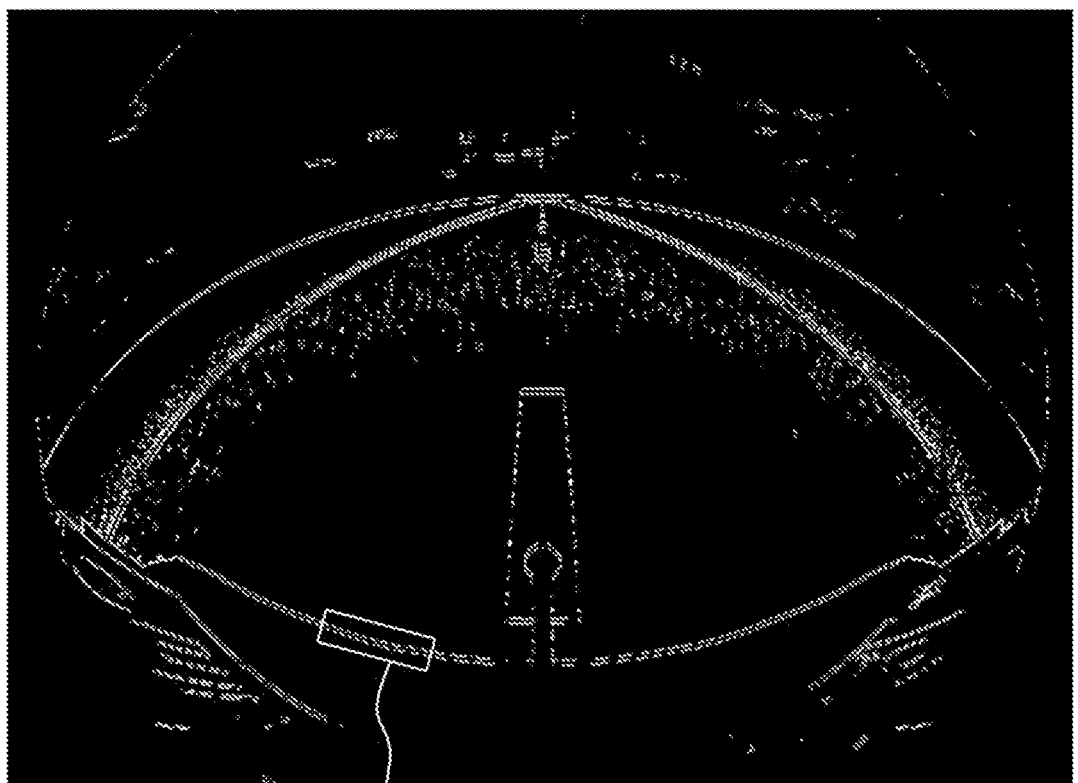
FIG. 13 is a diagram showing a differential image between an input edge image and a reference edge image when the input edge image is accurately extracted in a state where a tailgate according to an embodiment of the present invention is actually closed.

FIG. 13 is a diagram showing a differential image between an input edge image and a reference edge image when the input edge image is accurately extracted in a state where a tailgate according to an embodiment of the present invention is actually closed.

Referring to FIG. 13, when a differential image between a reference edge image and an input edge image extracted in a state where the tailgate is opened by, for example, an opening angle of 1 degree is generated, two edges may be illustrated by a double solid line at a fine interval in a search window 40 in the generated differential image. That is, in a state where the tailgate is opened, all of an edge included in the reference edge image and an edge included in the input edge image may be shown in the obtained differential image. In this case, the number of pixels representing the two edges may be greater than the number of pixels representing an edge shown in the reference edge image.

In the present invention, an open/close status of the tailgate may be determined by comparing the number of pixels, representing an edge (a partial edge or a double edge) included in a differential image, with a threshold value for determining an opened state of the tailgate. Here, the threshold value may be determined based on the number of pixels representing an edge (hereinafter referred to as a reference edge) shown in a reference edge image.

The threshold value may be determined to be a value which is less or greater than the number of pixels representing the reference edge. When direct light is irradiated onto a rear bumper, an edge of the rear bumper may be shown in the obtained differential image through reflection by a mirror. In this case, when the threshold value for determining an opened state of the tailgate is set to be less than the number of pixels of the reference edge, a case where the tailgate is abnormally determined to be opened may occur despite the tailgate being closed. In order to solve such a problem, the threshold value for determining an opened state of the tailgate is set to a value which is greater than or equal to the number of pixels representing the reference edge at least.

Referring again to FIG. 8, as described above, the determination unit 107 may determine an open/close status of the tailgate based on the number of pixels representing an edge of a rear bumper in a differential image. In other words, the determination unit 107 may analyze whether the edge of the rear bumper is or not in the differential image, and thus, may determine the open/close status of the tailgate.

The error determination unit 108 may determine whether an error occurs in a determination result of the determination unit 107.

When an obstacle such as a peripheral vehicle is located at a position close to the rear bumper, a shadow caused by the obstacle may occur in a surface of the rear bumper. The shadow may hinder the extraction of the edge of the rear bumper, and thus, an error may occur in the determination result of the determination unit 107.

As described above, in order to prevent abnormal determination caused by a peripheral environment of the rear bumper, in a case where the tailgate performs an opening and closing operation by using an electrical motor, the error determination unit 108 may detect an error of the determination result of the determination unit 107 by using motor rotation angle information provided from the motor controller 109 which controls the electrical motor.

In detail, when the determination unit 107 determines that the tailgate is in a closed state, the error determination unit 108 may receive a motor rotation angle from the motor controller 109 by using controller area network (CAN) communication and may compare the received motor rotation angle with an initial motor rotation angle to determine whether an error occurs in the determination result (a result where the open/close status of the tailgate is determined to be a closed state) of the determination unit 107.

For example, when the motor rotation angle received from the motor controller 109 is greater than the initial motor rotation angle at a current time, the error determination unit 108 may determine that an error occurs in the determination result of the determination unit 107. Here, the initial motor rotation angle may be a rotation angle of an electrical motor which defines the closed state of the tailgate.

The motor rotation angle being greater than the initial motor rotation angle may denote that the open/close status of the tailgate is an opened state. For example, when a current motor rotation angle is greater than the initial motor rotation angle, a result where the determination unit 107 determines the open/close status of the tailgate to be an opened state may be a determination error.

The error determination unit 108 may determine whether an error occurs in the determination result of the determination unit 107, based on the motor rotation angle information, and when it is checked that an error occurs, the error determination unit 108 may transfer an error occurrence notification message to the background change detection unit 110.

When the background change determination unit 110 receives the error occurrence notification message from the error determination unit 108, the background change determination unit 110 may determine that a rear camera image generated by the rear camera 101 or a background image included in an input binary image generated by the preprocessing unit 102 is changed, and when the background image is changed, the background change determination unit 110 may issue a request, to the determination unit 107, to again determine an open/close status of the tailgate.

The determination unit 107 may again determine an open/close status of the tailgate based on a redetermination request from the background change determination unit 110.

As described above, it is not easy to extract an edge in an image obtained in a dark environment where a shadow occurs in the rear bumper due to a peripheral obstacle. Accordingly, it may be required to extract an edge in an image obtained in a bright environment. That is, it may be required to extract an edge at a time at which a peripheral environment is changed from the dark environment to the bright environment.

The background change determination unit 110 may determine a change in a background image included in a rear camera image or an input binary image, so as to determine a time at which a peripheral environment of the rear bumper is changed from the dark environment to the bright environment.

To this end, for example, the background change determination unit 110 may separate a previous background image from a previous rear camera image and may separate a current background image from a current rear camera image. A background extraction algorithm known to those skilled in the art may be used for separating a background image from an original image.

Subsequently, the background change determination unit 110 may compare a pixel value of the previous background image with a pixel value of the current background image to determine a time at which the peripheral environment of the rear bumper is changed from the dark environment to the bright environment.

For reference, a background change may occur when an obstacle (for example, a peripheral vehicle) located near the rear bumper moves or a vehicle is changed from a stop state to a driving state.

As described above, an apparatus 100 for determining an open/close status of a tailgate based on a rear camera according to another embodiment of the present invention may include an error determination unit 108 and a background change determination unit 110, and thus, may extract an edge and may again determine an open/close status of the tailgate based thereon at a time at which a background image included in an image is changed based on a change in a peripheral environment, thereby preventing the abnormal determination of an open/close status caused by the non-detection of an edge.

In order to help understanding, the elements 101 to 110 included in the apparatus 100 for determining an open/close status of a tailgate may be merely classified by function units. Accordingly, some elements may be integrated into one element. For example, the preprocessing unit 102, the edge extraction unit 103, the differential image generating unit 104, a storage unit 105, the open/close status determination unit 107, the error determination unit 108, and the background change detection unit 110 may be integrated into one hardware element.

Moreover, the elements 102 to 110 capable of being integrated into one hardware element may be implemented as one software module. In this case, the one software module may be executed by a processor which includes at least one central processing unit (CPU) and/or at least one graphics processing unit (GPU).

Figure 14:
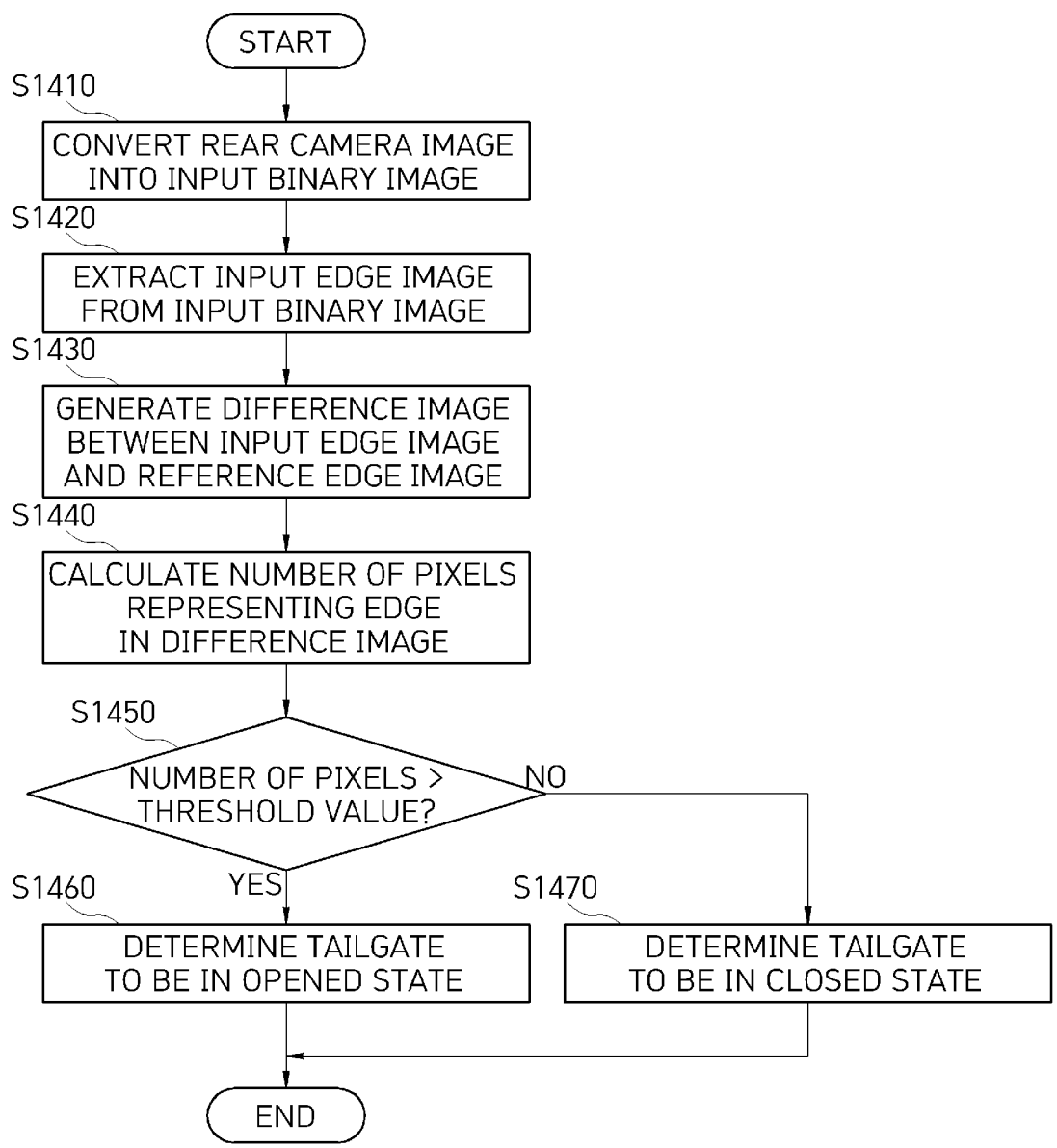
FIG. 14 is a flowchart for describing a method of determining an open/close status of a tailgate based on a rear camera according to another embodiment of the present invention.

FIG. 14 is a flowchart for describing a method of determining an open/close status of a tailgate based on a rear camera according to another embodiment of the present invention.

Referring to FIG. 14, first, in step S1410, a preprocessing process of converting a rear camera image, obtained by photographing a rear bumper of a vehicle, into an input binary image may be performed. Step S1410 may be performed by, for example, a processor or the preprocessing unit 102 illustrated in FIG. 8.

Subsequently, in step S1420, a process of extracting an input edge image, including an edge of the rear bumper, from the input binary image may be performed. Step S1420 may be performed by, for example, a processor or the edge extraction unit 103 illustrated in FIG. 8.

Subsequently, in step S1430, a process of generating a differential image between the input edge image and a reference edge image may be performed. Here, the reference edge image may be an edge image extracted from a rear camera image which is obtained by previously photographing the rear bumper in a state where the tailgate is closed. Step S1430 may be performed by, for example, a processor or the differential image generating unit 104 illustrated in FIG. 8.

Subsequently, in step S1440, a process of calculating (counting) the number of pixels representing an edge in the differential image may be performed. Step S1440 may be performed by, for example, a processor or the open/close status determination unit 107 illustrated in FIG. 8.

Subsequently, in step S1450, a process of comparing the calculated number of pixels with a threshold value may be performed. Step S1450 may be performed by, for example, a processor or the open/close status determination unit 107 illustrated in FIG. 8. Steps S1440 and S1450 may be integrated into one step.

In step S1460, when the calculated number of pixels is greater than the threshold value, a process of determining the tailgate to be in an opened state may be performed, and in step S1470, when the calculated number of pixels is less than or equal to the threshold value, a process of determining the tailgate to be in a closed state may be performed. Step S1460 may be performed by, for example, a processor or the open/close status determination unit 107. Steps S1440, S1450, and step S1460 may be integrated into one step.

Figure 15:
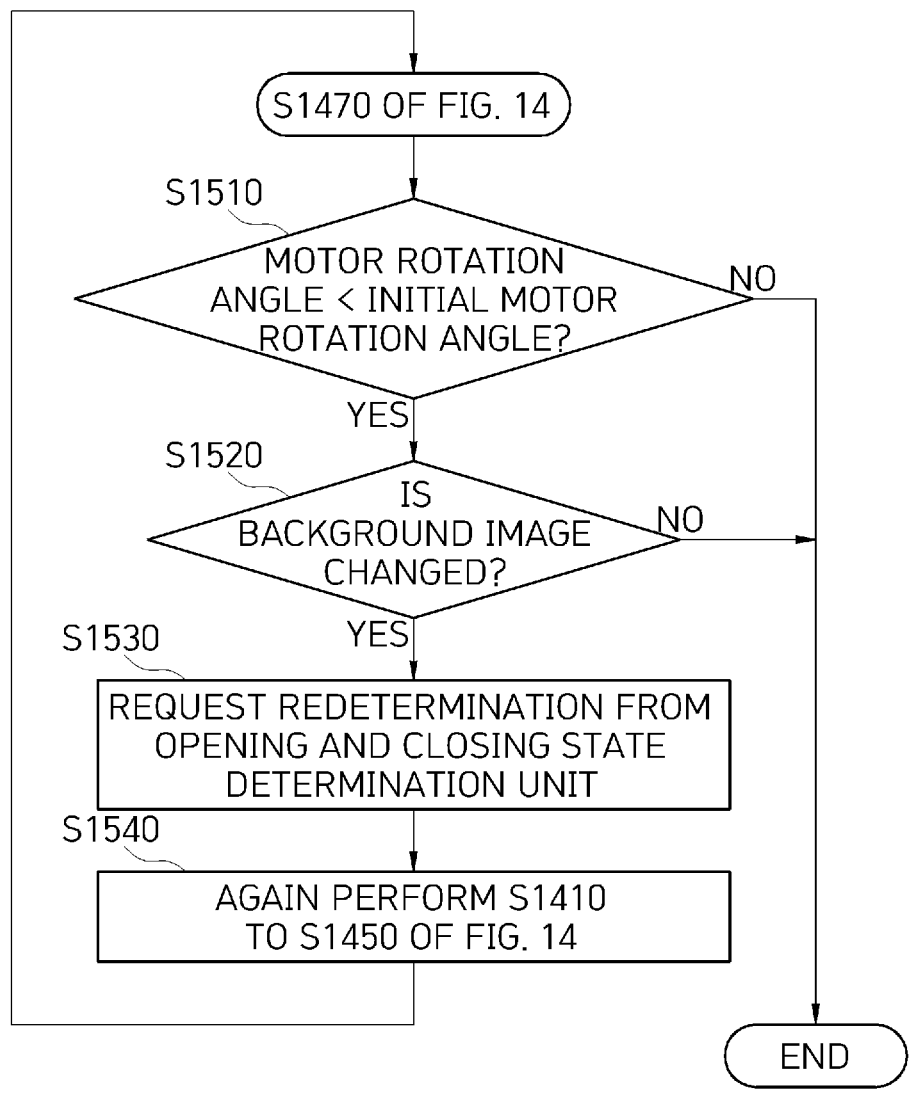
FIG. 15 is a flowchart for describing a method of determining whether an error occurs in a result where an open/close status determination unit illustrated in FIG. 8 determines a tailgate to be in a closed state.

FIG. 15 is a flowchart for describing a method of determining whether an error occurs in a result where the open/close status determination unit illustrated in FIG. 8 determines the tailgate to be in a closed state.

Referring to FIG. 15, first, in step S1510, when the open/close status determination unit 107 determines the tailgate to be in a closed state (S1470 of FIG. 14), a process of comparing an initial motor rotation angle and a current motor rotation angle received from the motor controller 109 may be performed. Step S1510 may be performed by the error determination unit 108 illustrated in FIG. 8.

In a case where the tailgate performs an opening and closing operation by using an electrical motor, the motor controller 109 may be a device which controls the electrical motor. The initial motor rotation angle may be a rotation angle which is set in a closed state of the tailgate.

When the current motor rotation angle is greater than the initial motor rotation angle, an open/close status of the tailgate may denote an opened state. In this case, that the open/close status determination unit 107 determines the tailgate to be in a closed state may be a clear error, and thus, it may not be required to further perform a process. That is, a driver may directly check an open/close status of the tailgate. On the other hand, when the current motor rotation angle is less than or equal to the initial motor rotation angle, an open/close status of the tailgate may denote a closed state. In this case, step S1520 may be performed.

In step S1520, a process of determining whether a background image included in a rear camera image obtained by a rear camera or an input binary image obtained by a preprocessing unit is changed may be performed. Step S1520 may be performed by the background change determination unit 110.

In order to determine whether the background image is not changed, a process of extracting a previous background image from a previous rear camera image and extracting a current background image from a current rear camera image may be performed. Subsequently, a process of comparing a pixel value of the previous background image with a pixel value of the current background image may be performed. When the pixel value of the previous background image differs from the pixel value of the current background image, the background change determination unit 110 may determine that a change in a background image occurs. When the change in the background image occurs, the background change determination unit 110 may request redetermination of an open/close status of the tailgate in step S1530.

Subsequently, in step S1540, steps S1410 to S1450 illustrated in FIG. 14 may be repeatedly performed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling opening of a tailgate of a vehicle, comprising:
    continuously capturing, using a rear camera positioned at the tailgate of the vehicle, a plurality of rear camera images while the tailgate is being opened, each captured rear camera image showing a user positioned near the tailgate;
    respectively converting the plurality of continuously captured rear camera images into a plurality of semantic segmentation images;
    estimating a height of the user based on a position change of a head region of the user shown in the plurality of semantic segmentation images;
    determining a target opening angle of the tailgate based on the estimated height of the user; and
    adjusting an opening amount of the tailgate based on the determined target opening angle.

2. The method of claim 1, further comprising converting each of the plurality of continuously captured rear camera images into a pin-hole camera image prior to respectively converting the plurality of continuously captured rear camera images into the plurality of semantic segmentation images.

3. The method of claim 1, wherein respectively converting the plurality of rear camera images into the plurality of semantic segmentation images comprises respectively converting, using a semantic segmentation neural network, the plurality of continuously captured rear camera images into the plurality of semantic segmentation images.

4. The method of claim 1, wherein:
    the plurality of continuously captured rear camera images comprises first and second rear camera images captured at first and second times, respectively, the second time being later than the first time,
    the plurality of semantic segmentation images comprises first and second semantic segmentation images converted from the first and second rear camera images, respectively, and
    estimating the height of the user comprises comparing (1) a first position of a head region of the user shown in the first semantic segmentation image and (2) a second position of the head region of the user shown in the second semantic segmentation image.

5. The method of claim 1, wherein:
the plurality of continuously captured rear camera images comprises first and second rear camera images captured at first and second times, respectively, the second time being later than the first time,
the plurality of semantic segmentation images comprises first and second semantic segmentation images converted from the first and second rear camera images, respectively, and
estimating the height of the user comprises:
calculating, based on the first semantic segmentation image, a first prediction line;
calculating, based on the second semantic segmentation image, a second prediction line from the second semantic segmentation image; and
analyzing, based on the first and second prediction lines, a position change of a head region of the user, and
wherein each of the first and second prediction lines comprises a virtual straight line extending between (1) position coordinates of the rear camera, positioned at a focal length from an image plane onto which the first and second semantic segmentation images are projected, and (2) uppermost coordinates of the head region of the user in the image plane.

6. The method of claim 1, wherein determining the target opening angle of the tailgate comprises determining, based on a lookup table, the target opening angle corresponding to the estimated height of the user.

7. The method of claim 6, wherein the lookup table includes a plurality of pre-learned opening angles determined based on a statistical hand height a person can reach when the person raises their arm above their head.

8. The method of claim 1, further comprising sensing a change in a distance between the user and the vehicle after estimating the height of the user and before detecting the target opening angle of the tailgate,
wherein determining the target opening angle of the tailgate comprises, after sensing the change to the distance, retrieving a user-defined opening angle as the target opening angle.

9. The method of claim 8, wherein sensing the change in the distance between the user and the vehicle comprises sensing, using a distance measurement sensor positioned at a rear bumper of the vehicle, the change in the distance.

10. A method of controlling opening of a tailgate of a vehicle, comprising:
continuously capturing, using a rear camera positioned at a tailgate of a vehicle, a plurality of rear camera images comprising first and second rear camera images while the tailgate is being opened, each captured rear camera image showing a user positioned near the tailgate of the vehicle;
projecting the first and second rear camera images onto an image plane;
respectively converting the projected first and second rear camera images into first and second semantic segmentation images;
calculating a first prediction line extending between (1) first uppermost coordinates of a user region included in the first semantic segmentation image, and (2) position coordinates of the rear camera positioned at a focal distance from the image plane;
calculating a second prediction line extending between (1) second uppermost coordinates of the user region included in the second semantic segmentation image, and (2) the position coordinates of the rear camera;
calculating an intersection point between the first prediction line and the second prediction line;
estimating a height of the user based on the calculated intersection point;
determining a target opening angle of the tailgate based on the estimated height of the user; and
adjusting an opening amount of the tailgate based on the determined target opening angle.

11. The method of claim 10, wherein determining the target opening angle of the tailgate comprises referring to a lookup table for the target opening angle corresponding to the estimated height of the user.

12. The method of claim 10, further comprising:
detecting that a distance between the first uppermost coordinates and the second uppermost coordinates is less than a threshold value; and
determining a default opening angle set by the user as the target opening angle of the tailgate.

13. The method of claim 10, further comprising:
sensing, using a distance measurement sensor positioned at a rear bumper of the vehicle, a change to a distance between the user and the vehicle; and
upon sensing the change to the distance between the user and the vehicle, determining a default opening angle set by the user as the target opening angle of the tailgate.

14. A method of determining an open/close status of a tailgate of a vehicle, comprising:
capturing, using a rear camera positioned at a tailgate of a vehicle, a rear camera image of a rear bumper of the vehicle;
using an edge extraction algorithm, extracting, from the rear camera image, an edge image including an edge of the rear bumper;
generating a differential image showing a difference between the extracted edge image and a reference edge image; and
determining an open/close status of the tailgate based on a number of pixels representing an edge included in the differential image.

15. The method of claim 14, wherein further comprising:
capturing, using the rear camera, a first rear camera image of the rear bumper while the tailgate is closed; and
obtaining the reference edge image from the captured first rear camera image of the rear bumper.

16. The method of claim 14, wherein determining the open/close status of the tailgate comprises comparing a threshold value with a number of pixels representing the edge included in the differential image.

17. The method of claim 16, further comprising:
capturing, using the rear camera, a first rear camera image of the rear bumper while the tailgate is closed;
obtaining the reference edge image from the captured first rear camera image of the rear bumper; and
determining the threshold value based on a number of pixels representing an edge included in the reference edge image.

18. The method of claim 16, wherein determining the open/close status of the tailgate comprises determining that the tailgate is open when the number of pixels is greater than the threshold value.

19. The method of claim 14, wherein determining the open/close status of the tailgate comprises:
determining that the tailgate is closed;
receiving a motor rotation angle from a motor controller controlling opening and closing of the tailgate;
comparing an initial motor rotation angle with the received motor rotation angle;

in response determining that the received motor rotation angle is less than or equal to the initial motor rotation angle, determining whether a background image included in the rear camera image has changed; and in response to determining that the background image has changed, determining the open/close status of the tailgate.

20. The method of claim 19, wherein the initial motor rotation angle is set when the tailgate is closed.

\* \* \* \* \*